(12) United States Patent
Eichenberger et al.

(10) Patent No.: US 8,667,260 B2
(45) Date of Patent: Mar. 4, 2014

(54) BUILDING APPROXIMATE DATA DEPENDENCES WITH A MOVING WINDOW

(75) Inventors: Alexandre E. Eichenberger, Chappaqua, NY (US); John K. P. O'Brien, South Salem, NY (US); Kathryn M. O'Brien, South Salem, NY (US); Kai-Ting A. Wang, North York (CA); Xiaotong Zhuang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1034 days.

(21) Appl. No.: 12/717,985

(22) Filed: Mar. 5, 2010

(65) Prior Publication Data

US 2011/0219222 A1   Sep. 8, 2011

(51) Int. Cl.
*G06F 9/44* (2006.01)

(52) U.S. Cl.
USPC .......................................... 712/241

(58) Field of Classification Search
None
See application file for complete search history.

(56) References Cited

U.S. PATENT DOCUMENTS

| | | | |
|---|---|---|---|
| 5,201,057 A | 4/1993 | Uht | |
| 5,987,254 A | 11/1999 | Subrahmanyam | |
| 6,065,105 A | 5/2000 | Zaidi et al. | |
| 6,931,514 B2 | 8/2005 | Shibayama et al. | |
| 7,418,583 B2 | 8/2008 | Shibayama et al. | |
| 7,950,012 B2 | 5/2011 | Tirumalai et al. | |
| 2002/0035663 A1* | 3/2002 | Finn et al. | 711/110 |
| 2002/0052856 A1 | 5/2002 | Satoh | |
| 2002/0111699 A1* | 8/2002 | Melli et al. | 700/18 |
| 2004/0054990 A1 | 3/2004 | Liao et al. | |
| 2004/0057495 A1 | 3/2004 | Lee et al. | |
| 2004/0128448 A1 | 7/2004 | Stark et al. | |
| 2004/0205740 A1 | 10/2004 | Lavery et al. | |
| 2005/0071841 A1 | 3/2005 | Hoflehner et al. | |
| 2006/0047495 A1 | 3/2006 | Sanchez et al. | |
| 2007/0174555 A1 | 7/2007 | Burtscher et al. | |
| 2008/0162889 A1 | 7/2008 | Cascaval et al. | |
| 2009/0138862 A1 | 5/2009 | Tanabe et al. | |
| 2010/0287550 A1 | 11/2010 | Eichenberger et al. | |

FOREIGN PATENT DOCUMENTS

WO   WO 2007/131224 A2   11/2007

OTHER PUBLICATIONS

USPTO U.S. Appl. No. 13/443,515.
Interview Summary dated Oct. 19, 2012 for U.S. Appl. No. 13/443,515; 3 pages.

(Continued)

*Primary Examiner* — Andrew Caldwell
*Assistant Examiner* — John Lindlof
(74) *Attorney, Agent, or Firm* — Stephen J. Walder, Jr.; William Stock

(57) ABSTRACT

Mechanisms for building approximate data dependences using a moving look-back window are provided. The mechanisms track dependence information for memory accesses over iterations of execution of a portion of code. The mechanisms receive a memory access of an iteration of the portion of code, the memory access having an address for access the memory and an access type indicating at least one of a read or a write access type. An entry in a moving look-back window data structure is generated corresponding to a memory location accessed by the memory access. The entry comprises at least an identification of the address, the access type, and an iteration number corresponding to the iteration of the memory access. The moving look-back window data structure is utilized to determine dependence information for memory accesses over a plurality of iterations of the portion of code.

25 Claims, 24 Drawing Sheets

(56) References Cited

OTHER PUBLICATIONS

Office Action mailed Aug. 16, 2012 for U.S. Appl. No. 13/443,515; 14 pages.
Response to Office Action filed Oct. 17, 2012 for U.S. Appl. No. 13/443,515; 30 pages.
Office Action mailed Oct. 5, 2011 for U.S. Appl. No. 12/435,809; 18 pp.
Interview Summary mailed on Jan. 4, 2012 for U.S. Appl. No. 12/435,809; 3 pages.
Notice of Allowance mailed on Feb. 29, 2012 for U.S. Appl. No. 12/435,809; 26 pages.
Response to Office Action filed with the USPTO on Jan. 3, 2012 for U.S. Appl. No. 12/435,809; 30 pages.
Notice of Allowance mailed Feb. 5, 2013 for U.S. Appl. No. 13/443,515; 8 pages.
USPTO U.S. Appl. No. 12/435,809.
Blume, William et al., "Nonlinear and Symbolic Data Dependence Testing", IEEE Transactions on Parallel and Distributed Systems, vol. 9, Issue 12, 1998, 6 pages.
Chen, Ding-Kai et al., "An Efficient Algorithm for the Run-Time Parallelization of Doacoss Loops", In Proceedings of Supercomputing, 1994, pp. 1-32.
Chen, Lei et al., "Dynamic Data Dependence Tracking and its Application to Branch Prediction", IEEE, Proceedings of The Ninth International Symposium on High-Performance Computer Architecture (HPCA-9'03), 2002, 12 pages.
Krothapalli, V.P. et al., "An Approach to Synchronization for Parallel Computing", ACM, Jun. 1988, pp. 573-581.
Leung, Shun-Tak et al., "Improving the Performance of Runtime Parallelization", 4th ACM PPOPP, May 1993, pp. 83-91.
Midkiff, Samuel P. et al., "Compiler Algorithms for Synchronization", IEEE Transactions on Computers, vol. C-36, No. 12, Dec. 1987, pp. 1485-1495.
Polychronopoulos, Constantine D., "Compiler Optimizations for Enhancing Parallelism and Their Impact on Architecture Design", IEEE Transactions on Computers, vol. 37, No. 8, Aug. 1988, pp. 991-1004.
Rauchwerger, Lawrence et al., "A Scalable Method for Run-Time Loop Parallelization", IJPP, 26(6), Jul. 1995, 21 pages.
Rauchwerger, Lawrence et al., "Run-Time Methods for Parallelizing Partially Parallel Loops", International Conference on Supercomputing, 1995, 10 pages.
Saltz, Joel H. et al., "Run-time parallelization and scheduling of loops", NASA Contractor Report 181763, Dec. 1988, 35 pages.
Saltz, Joel H. et al., "The Proprocessed Doacross Loop", NASA Contractor Report 182056, ICASE Interim Report 11, May 1990, 18 pages.
Zhu, C et al., "A scheme to enforce data dependence on large multiprocessor systems", IEEE Transactions Software Engineering, 13(6), Jun. 1987, pp. 726-739.

\* cited by examiner

```
ic = next[i]; //ic=i
ncfaces = Geom.nfpc[ic]; //=3 for (icface=1;icface<=ncfaces;icface++) {
    afpm[icface] = omega[1]*Geom.A_surf[1][icface][1][ic] + omega[2]*Geom.A_surf[2][icface][1][ic] +
                    omega[3]*Geom.A_surf[3][icface][1][ic];
    aezm[icface] = omega[1]*Geom.A_surf[1][icface][2][ic] + omega[2]*Geom.A_surf[2][icface][2][ic] +
                    omega[3]*Geom.A_surf[3][icface][2][ic];
    if ( afpm[icface] < 0.0 ){
        ...=psifp[1..NPART][icface][ic];
    }
    if (aezm[icface] < 0.0 ) {
        ...=curez[1..NPART][icface][ic];
    }else{
        ifp = icface;
        for( k=1; k<=ncfaces-2; k++){
            ifp = ifp%ncfaces + 1;
            if ( afpm[ifp] < 0.0 ) {
                ...=psifp[1...NPART][ifp][ic];
            }
        }
        curez[1..NPART][Geom.Connect[4][icface][ic]][Geom.Connect[3][icface][ic]] =...
    }
    if (afpm[icface] > 0.0 && Geom.Connect[1][icface][ic]!=0)
        psifp[1..NPART][Geom.Connect[2][icface][ic]][Geom.Connect[1][icface][ic]] =...
}
```

400 (figure label)
406 → if ( afpm[icface] < 0.0 )
402 → ...=psifp[1..NPART][icface][ic];
408 → if (aezm[icface] < 0.0 )
404 → ...=curez[1..NPART][icface][ic];
414 → curez[1..NPART][Geom.Connect[4][icface][ic]][Geom.Connect[3][icface][ic]] =...
412 → psifp line

FIG. 4

DEPENDENCES FOUND
BY DEPENDENCE
THREADS
524

```
Linkedlist dependenceCheckingFunction(int i) {
Linkedlist l=new Linkedlist();
ic = next[i]; //ic=i
ncfaces = Geom.nfpc[ic]; //=3
for (icface=1;icface<=ncfaces;icface++) {
    afpm[icface] = omega[1]*Geom.A_surf[1][icface][1][ic] + omega[2]*Geom.A_surf[2][icface][1][ic] +
        omega[3]*Geom.A_surf[3][icface][1][ic];
    aezm[icface] = omega[1]*Geom.A_surf[1][icface][2][ic] + omega[2]*Geom.A_surf[2][icface][2][ic] +
        omega[3]*Geom.A_surf[3][icface][2][ic];
    if ( afpm[icface] < 0.0 ){
        l.add(new Dept(psifp,ic,USE)); //...=psifp[1..NPART][icface][ic];    ~702
    }
    if (aezm[icface] < 0.0 ) {
        l.add(new Dept(curez,ic,USE)); //...=curez[1..NPART][icface][ic];    ~704
    }else{
        ifp = icface;
        for( k=1; k<=ncfaces-2; k++){
            ifp = ifp%ncfaces + 1;
            if ( afpm[ifp] < 0.0 ) {
                l.add(new Dept(psifp,ic,USE)); //...=psifp[1...NPART][ifp][ic];    ~706
            }
        }
    }
    l.add(new Dept(curez,Geom.Connect[3][icface][ic],DEF)); //curez[1..NPART][Geom.Connect[4][icface][ic]][Geom.Connect[3][icface][ic] =...    ~708
    if (afpm[icface] > 0.0 && Geom.Connect[1][icface][ic]!=0)
        l.add(new Dept(psifp,Geom.Connect[1][icface][ic],DEF)); //psifp[1..NPART][Geom.Connect[2][icface][ic]][Geom.Connect[1][icface][ic] =...    ~710
}
Return l;
}
```

FIG. 7

1232 — SLICE OUTPUT: { (a, 1, WRITE), (b, 2, READ) }

INIT AFTER PROCESSING ITERATION 11
- dep[12] = -1;

|  | 0 | 1 | 2 | 3 |
|---|---|---|---|---|
| Ur: READ VERSION ARRAY FOR a[ ] | -1 | -1 | -1 | -1 |
| Uw: WRITE VERSION ARRAY FOR a[ ] | -1 | 4 | -1 | -1 |
| Vr: READ VERSION ARRAY FOR b[ ] | -1 | -1 | 6 | -1 |
| Vw: WRITE VERSION ARRAY FOR b[ ] | -1 | -1 | 1 | -1 |

} 1234

PROCESS (a, 1, write)
- d = max(Ur[1],Uw[1]) = max(4,-1) = 4;
- Uw[1] = 12;
- dep[12] = max(-1, 4) = 4

|  | 0 | 1 | 2 | 3 |
|---|---|---|---|---|
| Ur | -1 | -1 | -1 | -1 |
| Uw | -1 | 12 | -1 | -1 |
| Vr | -1 | -1 | 6 | -1 |
| Vw | -1 | -1 | 1 | -1 |

} 1236

PROCESS (b, 2, read)
- d = Vw[2] = 1;
- Vr[2] = 12;
- dep[12] = max(4, 1) = 4

|  | 0 | 1 | 2 | 3 |
|---|---|---|---|---|
| Ur | -1 | -1 | -1 | -1 |
| Uw | -1 | 12 | -1 | -1 |
| Vr | -1 | -1 | 12 | -1 |
| Vw | -1 | -1 | 1 | -1 |

} 1238

BUILDING APPROXIMATE DATA DEPENDENCES WITH A MOVING WINDOW

BACKGROUND

The present application relates generally to an improved data processing apparatus and method and more specifically to mechanisms for building approximate data dependences information with a moving window.

A compiler is a computer program, or set of programs, that transforms source code written in a computer language into another computer language that is executable by a computing device, e.g., object code having a binary form. Many types of compilers today also perform optimizations on the source code as part of the transformation from source code to object code or executable code. These optimizations involve tuning the output of the compiler so as to minimize or maximize some attributes of the executable program. For example, such optimizations may be directed to minimizing the time taken to execute a program, minimize the amount of memory used by the program, minimize the power consumed by the computer in running the program by minimizing the number of resources utilized, etc.

In performing such optimizations, it is often necessary for the compiler to determine runtime dependences between portions or segments of code. Runtime dependences describe how code segments depend on each other. A dependence is essentially two or more statements addressing the same memory location. For example, one type of optimization that a compiler may perform is loop optimization in which a loop code in the executable code is parallelized by transforming the loop code into code that may be executed in a parallel manner by multiple threads. In order to perform such loop optimization, it is important to know how memory accesses by the loop code may be dependent upon each other.

It is well known that compiler optimizers make conservative assumptions to ascertain that code is generated correctly. Therefore, many runtime dependences are assumed to exist by the compiler but are actually non-existent. Even if a dependence occurs only once at runtime, the compiler has to assume its existence, which prohibits many optimizations. Moreover, a major difficulty for loop parallelization is the uncertainty of memory accesses across iterations, which are often impossible to determine at compilation time. Several obstacles may prevent the compiler from properly deriving these dependences, such as pointer accesses that may not be determined statically, uncertain control flow that may bypass some memory accesses, array elements indexed by complicated computations, or array elements indexed by other arrays (indirect array accesses). If a possible cross-iteration access is guarded by a conditional branch, there is often little the compiler can do to help eliminate the uncertainty of this possible cross-iteration access.

The programmer may have a great deal of knowledge about the likely behavior of the code, but it is rare that this knowledge is made available to the compiler due to the lack of time or the expressiveness in the programming language. As a result, the runtime behavior of a program is often much more constrained by the compiler than is strictly necessary in order to capture all possible dependences when optimizing the code. It may be that dependences that occur in real executions are fewer and simpler than the pessimistic scenario the compiler is forced to assume.

This lack of knowledge by the compiler regarding runtime dependences prevents code from being parallelized in an optimal manner. Parallelization opportunities may be lost for code that is completely parallelizable or partially parallelizable due to the fact that the compiler must take a more pessimistic approach to optimizations as noted above. Most compilers cannot handle parallelism that exists only in part of the code. For example, a loop is either completely parallelizable or executed sequentially. In other words, a slight chance of dependence renders the loop completely non-parallelizable. However, often times some of the iterations can be executed in parallel with other iterations in a limited scope.

Under many circumstances, capturing runtime dependences must be achieved with low overhead. For parallelization that requires this dependency information to be fed back quickly, the amount of time spent on getting the runtime dependences is critical. This is also important for other just-in-time optimizations.

SUMMARY

In one illustrative embodiment, a method, in a data processing system, is provided tracking dependence information for memory accesses over iterations of execution of a portion of code. A memory access of an iteration of the portion of code is received, the memory access having an address for access the memory and an access type indicating at least one of a read or a write access type. An entry in a moving look-back window data structure is generated corresponding to a memory location accessed by the memory access. The entry comprises at least an identification of the address, the access type, and an iteration number corresponding to the iteration of the memory access. The moving look-back window data structure is utilized to determine dependence information for memory accesses over a plurality of iterations of the portion of code. A scheduling of memory accessed by an execution of the portion of code is modified based on the determined dependence information for memory accesses.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 depicts an example of code in a loop body in accordance with an illustrative embodiment;

FIG. 7 depicts an example of building a dependence checking code for the Unstructured Mesh of Transport (UMT) benchmark in accordance with an illustrative embodiment;

DETAILED DESCRIPTION

Figure 1:
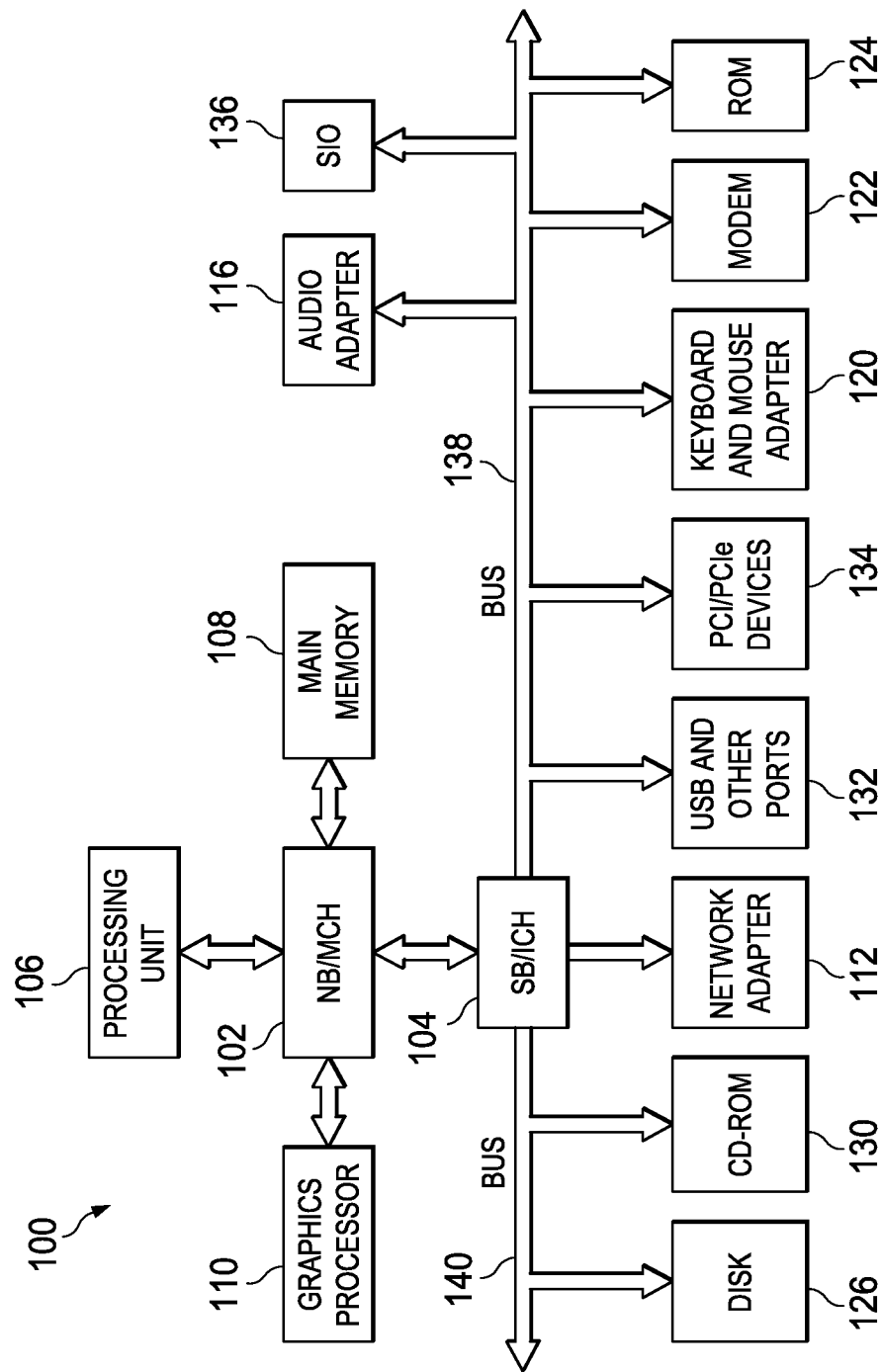
FIG. 1 depicts an exemplary diagram of a data processing environment in which embodiments of the present invention may be implemented.

The illustrative embodiments provide a mechanism for a runtime dependence-aware scheduling of independent iterations so that the independent iterations are scheduled and executed ahead of time in parallel with other iterations. Within the illustrative embodiments, threads other than a main thread or threads on cores on a multi-core chip are used to compute dependences within a loop as the loop executes. The other threads feed this information to a scheduler thread that is able to parallelize some of the iterations across other threads operating simultaneously. Computing dependences within a loop as the loop executes allows loops that are otherwise not parallelizable to be parallelized.

As a further improvement, in some illustrative embodiments, rather than tracking dependence information for all dependences within a portion of code across all iterations of the portion of code, dependence information is tracked and maintained for a moving look-back window that may comprise a much smaller subset of the dependences. That is, the moving look-back window defines a maximum dependence distance that is tracked by the mechanisms of the illustrative embodiments. The dependence distance is essentially a measure of the nearest iteration, to the current iteration being considered, upon which the current iteration depends, e.g., if iteration 3 depends on iteration 1, then the dependence distance is 2.

The moving look-back window may be implemented using a self-purging hash data structure, circular buffer, or other like mechanism that may be dynamically updated and used to track a limited number of dependences within a portion of code. The moving look-back window has a fixed memory cost to reduce irregular memory accesses. Moreover, the moving look-back window is dynamically updated as memory accesses occur and additional iterations of the portion of code are executed.

By using a moving look-back window, the amount of dependence information that needs to be maintained by the system is greatly reduced while providing an ability to build approximate and safe dependences with very low overhead. These moving look-back window mechanisms of the illustrative embodiments are based on the observation that often times, especially for parallelizing loops with partial dependences, dependence relationships to closer iterations are more important when considering parallelization optimizations. Thus, in order to address the majority of parallelization opportunities within portions of code, it is not necessary to track all dependences over all iterations. Instead, looking at a narrower window of dependences that are local to the current iteration should be able to capture most of the optimization opportunities.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
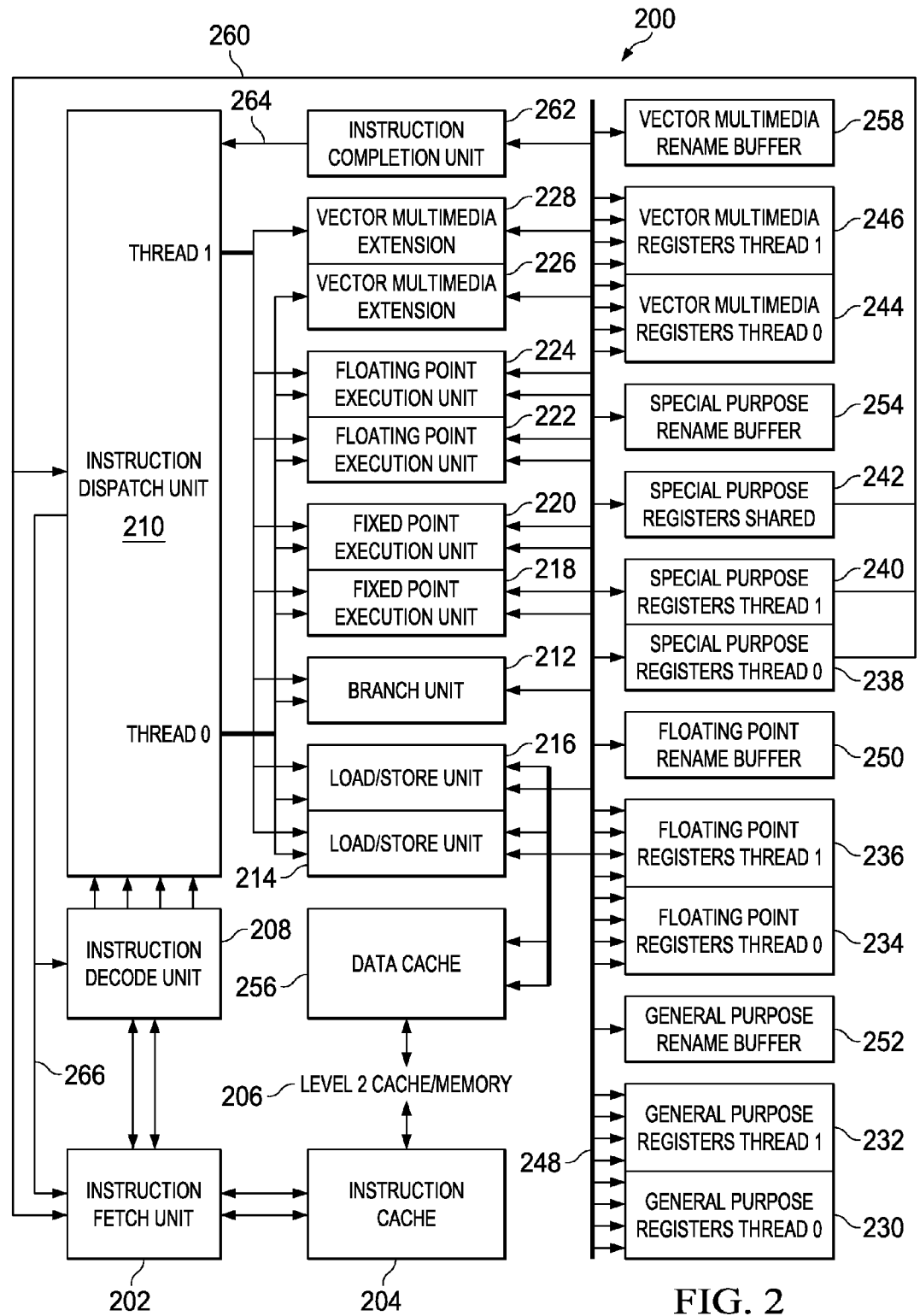
FIG. 2 depicts an exemplary block diagram of a conventional dual threaded processor design showing functional units and registers in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a runtime dependence-aware scheduling mechanism that schedules and executes independent iterations ahead of time in parallel with other iterations, this is only an example and is not intended to state or imply any limitation with regard to the features of the present invention. To the contrary, the illustrative embodiments are intended to include distributed data processing environments and embodiments in which independent iterations are scheduled at runtime and executed ahead of time in parallel with other iterations.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts an exemplary diagram of a data processing environment in which embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

With reference now to FIG. 1, a block diagram of a data processing system is shown in which illustrative embodiments may be implemented. Data processing system 100 is an example of a computer in which computer usable code or instructions implementing the processes may be located for the illustrative embodiments.

In the depicted example, data processing system 100 employs a hub architecture including a north bridge and memory controller hub (MCH) 102 and a south bridge and input/output (I/O) controller hub (ICH) 104. Processing unit 106, main memory 108, and graphics processor 110 are coupled to north bridge and memory controller hub 102. Processing unit 106 may contain one or more processors and even may be implemented using one or more heterogeneous processor systems. Graphics processor 110 may be coupled to the MCH through an accelerated graphics port (AGP), for example.

In the depicted example, local area network (LAN) adapter 112 is coupled to south bridge and I/O controller hub 104 and audio adapter 116, keyboard and mouse adapter 120, modem 122, read only memory (ROM) 124, universal serial bus (USB) ports and other communications ports 132, and PCI/PCIe devices 134 are coupled to south bridge and I/O controller hub 104 through bus 138, and hard disk drive (HDD) 126 and CD-ROM drive 130 are coupled to south bridge and I/O controller hub 104 through bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be coupled to south bridge and I/O controller hub 104.

An operating system runs on processing unit 106 and coordinates and provides control of various components within data processing system 100 in FIG. 1. The operating system may be a commercially available operating system such as Microsft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 100. Java and all Java-based trademarks are trademarks of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processing unit 106. The processes of the illustrative embodiments may be performed by processing unit 106 using computer implemented instructions, which may be located in a memory such as, for example, main memory 108, read only memory 124, or in one or more peripheral devices.

The hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system.

In some illustrative examples, data processing system 100 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted examples in FIG. 1 and above-described examples are not meant to imply architectural limitations. For example, data processing system 100 also may be a tablet computer, laptop computer, or telephone device in addition to taking the form of a PDA.

Referring to FIG. 2, an exemplary block diagram of a conventional dual threaded processor design showing functional units and registers is depicted in which aspects of the illustrative embodiments may be implemented. Processor 200 may be implemented as processing unit 106 in FIG. 1 in these illustrative examples. Processor 200 comprises a single integrated circuit superscalar microprocessor with dual-thread simultaneous multi-threading (SMT). Accordingly, as discussed further herein below, processor 200 includes various units, registers, buffers, memories, and other sections, all of which are formed by integrated circuitry. Also, in an illustrative embodiment, processor 200 operates according to reduced instruction set computer (RISC) techniques.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 may request multiple instructions from instruction cache 204 for up to two threads at the same time. Instruction decode unit 208 decodes multiple instructions for up to two threads at the same time and passes decoded instructions to instruction dispatch unit (IDU) 210. IDU 210 selectively groups decoded instructions from instruction decode unit 208 for each thread, and outputs or issues a group of instructions for each thread to execution units 212, 214, 216, 218, 220, 222, 224, 226, and 228 of the processor.

In an illustrative embodiment, the execution units of the processor may include branch unit 212, load/store units (LSUA) 214 and (LSUB) 216, fixed-point execution units (FXUA) 218 and (FXUB) 220, floating-point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246, which may also be referred to as architected register files (ARFs).

An ARF is a file where completed data is stored once an instruction has completed execution. ARFs 230, 232, 234, 236, 238, 240, 242, 244, and 246 may store data separately for each of the two threads and by the type of instruction, namely general purpose registers (GPR) 230 and 232, floating-point registers (FPR) 234 and 236, special purpose registers (SPR) 238 and 240 and vector registers (VR) 244 and 246. Separately storing completed data by type and by thread assists in reducing processor contention while processing instructions.

The processor additionally includes a set of shared special purpose registers (SPR) 242 for holding program states, such as an instruction pointer, stack pointer, or processor status word, which may be used on instructions from either or both threads. Execution units 212, 214, 216, 218, 220, 222, 224, 226, and 228 are connected to ARFs 230, 232, 234, 236, 238, 240, 242, 244, and 246 through simplified internal bus structure 248.

In order to execute a floating point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs to. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 output their destination register operand data to SPRs 238, 240, and 242 when the instruction has passed the point of flushing in the pipeline. During execution of an instruction, VMXA 226 and VMXB 228 output their destination register operand data to VRs 244 and 246 when the instruction has passed the point of flushing in the pipeline.

Data cache 256 may also have associated with it a non-cacheable unit (not shown) which accepts data from the processor and writes it directly to level 2 cache/memory 206, thus bypassing the coherency protocols required for storage to cache.

In response to the instructions input from instruction cache 204 and decoded by instruction decode unit 208, IDU 210 selectively dispatches the instructions to execution units 212, 214, 216, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed-point mathematical operations on register source operands, such as addition, subtraction, ANDing, ORing and XORing. FPUA 222 and FPUB 224 execute floating-point mathematical operations on register source operands, such as floating-point multiplication and division. LSUA 214 and LSUB 216 execute load and store instructions, which move operand data between data cache 256 and ARFs 230, 232, 234, and 236. VMXA 226 and VMXB 228 execute single instruction operations that include multiple data. Branch unit 212 executes branch instructions which conditionally alter the flow of execution through a program by modifying the instruction address used by IFU 202 to request instructions from instruction cache 204.

IDU 210 groups together instructions that are decoded by instruction decode unit 208 to be executed at the same time, depending on the mix of decoded instructions and available execution units 212, 214, 216, 218, 220, 222, 224, 226, and 228 to perform the required operation for each instruction. For example, because there are only two load/store units 214 and 216, a maximum of two load/store type instructions may be grouped together. In an illustrative embodiment, up to seven instructions may be grouped together (two fixed-point arithmetic, two load/store, two floating-point arithmetic (FPU) or two vector multimedia extension (VMX), and one branch), and up to five instructions may belong to the same thread. IDU 210 includes in the group as many instructions as possible from the higher priority thread, up to five, before including instructions from the lower priority thread. Thread priority is determined by the thread's priority value and the priority class of its process. The processing system uses the base priority level of all executable threads to determine which thread gets the next slice of processor time. Threads are scheduled in a round-robin fashion at each priority level, and only when there are no executable threads at a higher level does scheduling of threads at a lower level take place.

However, IDU 210 dispatches either FPU instructions 222 and 224 or VMX instructions 226 and 228 in the same group with FXU instructions 218 and 220. That is, IDU 210 does not dispatch FPU instructions 222 and 224 and VMX instructions 226 and 228 in the same group. Program states, such as an instruction pointer, stack pointer, or processor status word, stored in SPRs 238 and 240 indicate thread priority 260 to IDU 210.

Instruction completion unit 262 monitors internal bus structure 248 to determine when instructions executing in execution units 212, 214, 216, 218, 220, 222, 224, 226, and 228 are finished writing their operand results to rename buffers 250, 252, 254, or 258. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228 and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 262 monitors for the completion of instructions, and sends control information 264 to IDU 210 to notify IDU 210 that more groups of instructions can be dispatched to execution units 212, 214, 216, 218, 220, 222, 224, 226, and 228. IDU 210 sends dispatch signal 266, which serves as a throttle to bring more instructions down the pipeline to the dispatch unit, to IFU 202 and instruction decode unit 208 to indicate that it is ready to receive more decoded instructions.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

Again, the illustrative embodiments provide a mechanism for a runtime dependence-aware scheduling of independent iterations so that the independent iterations are scheduled and executed ahead of time in parallel with other iterations. Moreover, some of the illustrative embodiments provide an additional improvement in which dependence information is maintained for dependences within a maximum window of dependence distance. Hereby, dependence distance means the number of iterations between iteration A and iteration B, which iteration A depends on. In other words, iteration A must be scheduled after iteration B finishes. The functionality of the embodiments described hereafter may be implemented in hardware, software, or any combination of hardware and software. In some of the illustrative embodiments, the dependence aware scheduling mechanisms may be part of a runtime library and thus, may be implemented in software executed by one or more processors of one or more data processing systems or devices. This runtime library may be utilized by a just-in-time compiler, or other type of compiler, optimization engine, or the like, to use dependence information to guide the scheduling of parallel iterations of code.

Figure 3:
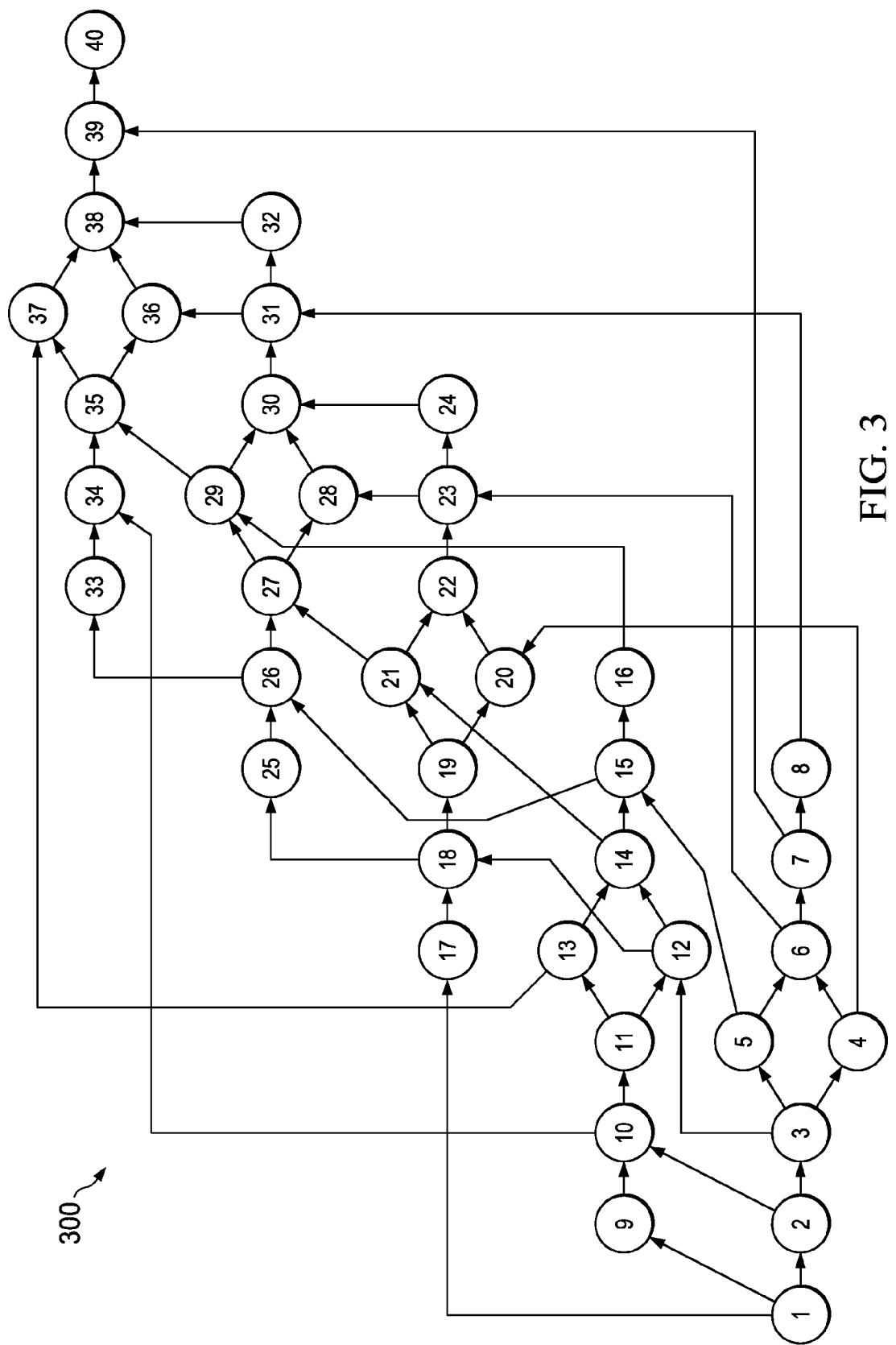
FIG. 3 depicts an example of a dependence Directed Acyclic Graph (DAG) of a benchmark called Unstructured Mesh of Transport (UMT) for forty iterations in accordance with an illustrative embodiment.

In order to better understand the mechanisms of the various illustrative embodiments it is first important to understand the concept of a directed acyclic graph which may be used to determine such dependences. A dependence Directed Acyclic Graph (DAG) describes dependence relationships among iterations. FIG. 3 depicts an example of such a dependence Directed Acyclic Graph (DAG) of an Unstructured Mesh of Transport code (UMT) benchmark for forty iterations in accordance with an illustrative embodiment. In dependence DAG 300, dependences are considered between iterations; however, the illustrative embodiments are not limited to only these types of iterations. That is, the illustrative embodiment may also arbitrarily group two or more consecutive iterations and consider the group as a unit from which to detect dependences. Also, if the loop body is large, the illustrative embodiments may also split a single loop iteration into two or more groups of consecutive instructions and then consider each group as a unit from which to detect dependences. Furthermore, there may be arbitrary control flow (including nested loops) within a unit from which dependences are detected.

Dependence DAG 300 may be built statically through compiler analyses. However, due to the uncertainty of memory accesses, statically built dependence DAGs are often too conservative. In other words, statically built dependence DAGs may include many unnecessary edges. On the other hand, at runtime all memory accesses are resolved and a true picture is provided regarding which iterations access the same data unit. Using such dependence information, dependence DAG 300 may be built. To reduce the size of dependence DAG 300, indirect dependence edges may be removed. For example, if iteration 10 is dependent on iteration 5 and iteration 1, while iteration 5's dependency on iteration 1 is already on the DAG, the edge from iteration 10 being dependent on iteration 1 may be considered as not needed. On the other hand, the illustrative embodiments are not limited by any hardware buffer size, as the illustrative embodiments use programmable threads to determine dependences between iterations. In addition, determining dependences among iterations (a unit of arbitrary many instructions) may be more beneficial when looking at thread-level parallelism because instructions may be too small a unit of work, whereas iterations encompass larger units of work that are better suited for thread level parallelism.

The depicted dependence DAG 300 is built from a benchmark program that simulates interactions among elements in a 2D or 3D space. Dependence DAG 300 may be constructed based on code in a loop body, for example. The depicted dependence DAG 300 illustrates that, for example, iterations 2, 9, and 17 are dependent on iteration 1. However, once iteration 1 is complete, iterations 2, 9 and 17 may be executed independently of each other.

FIG. 4 depicts an example of code in a loop body in accordance with an illustrative embodiment. Code 400 mainly contains accesses to two arrays, array psifp and array curez, that may cause loop carried dependences. One of the possible dependences is between statement 414 where array curez is defined and statement 404 where array curez is potentially used. Another of the possible dependence is between statement 412 where array psifp is potentially defined and statement 402 where array psifp is used. Accesses to array psifp and array curez may be predicated by the values of two local arrays: afpm 406 and aezm 408. In code 400, both read and write accesses are present. Since values of arrays afpm 406 and aezm 408 are unknown at compilation time, there is no way for the compiler to compute the memory access pattern. Therefore, the compiler gives up parallelizing the loop and instead forces the loop to be executed sequentially.

As mentioned earlier, complicated access patterns and dependences are very difficult to derive using static analysis. As is illustrated in dependence DAG 300 of FIG. 3, opportunities for parallelizing part of the iterations appear to be sporadic. Often, only a small number of iterations exist between a dependent iteration and the iteration on which it depends. However, if some of these opportunities can be captured, the potential speedup may be quite promising.

Given the need to capture small parallelization opportunities at runtime, the illustrative embodiments provide a dynamic optimization which may be referred to as dependence-aware scheduling using assist thread. The illustrative embodiments identify the dependence distance on the DAG which is good enough for independent iterations to be scheduled and executed ahead of time in parallel with other iterations. Moreover, illustrative embodiments may maintain dependence information for a maximum moving look-back window dependence distance so as to minimize the overhead in performing determinations as to how to parallelize portions of code.

Figure 5A:
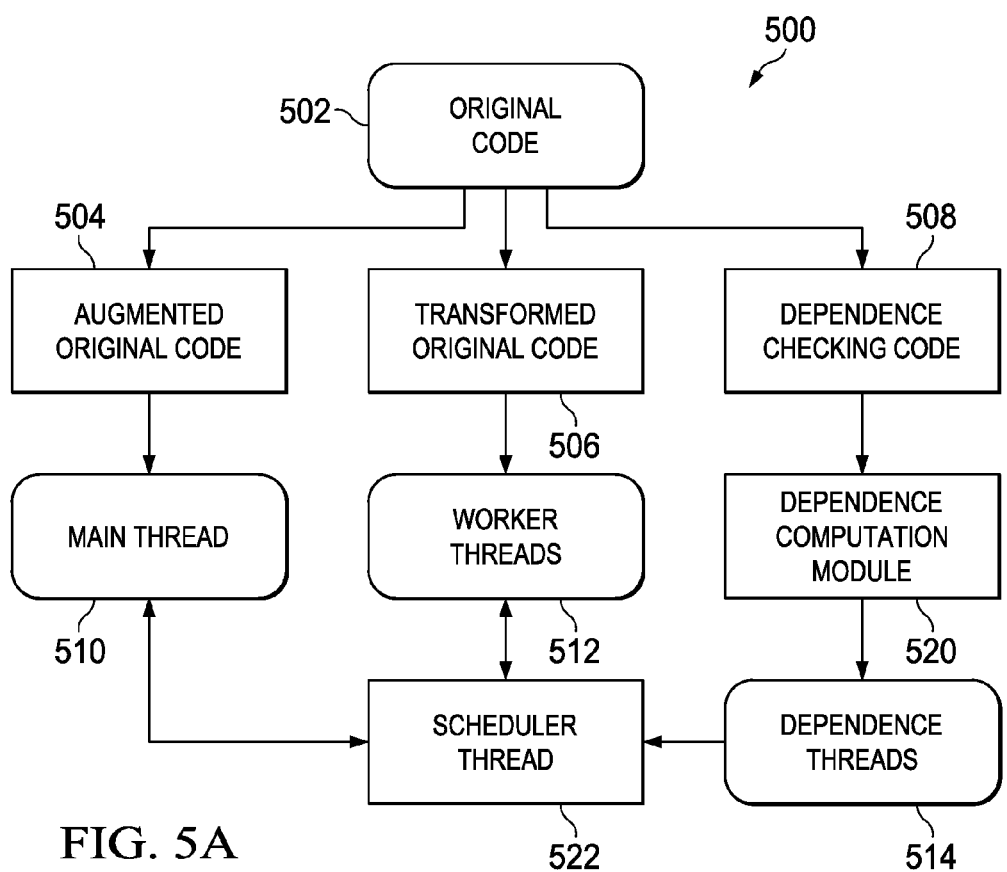
FIGS. 5A-5C depict a functional block diagram of a dependence-aware scheduling mechanism in accordance with an illustrative embodiment.
Figure 5B:
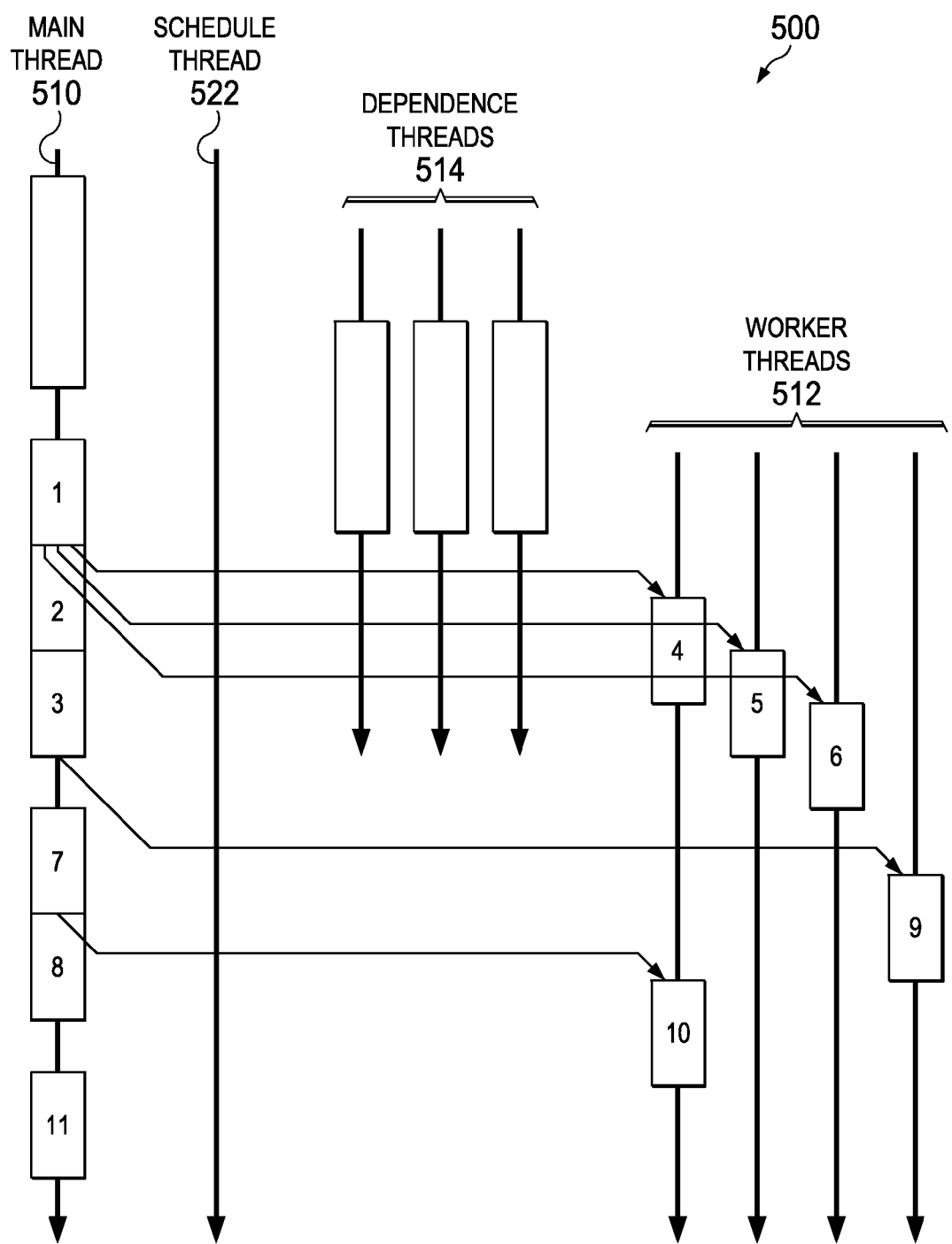
Figure 5C:
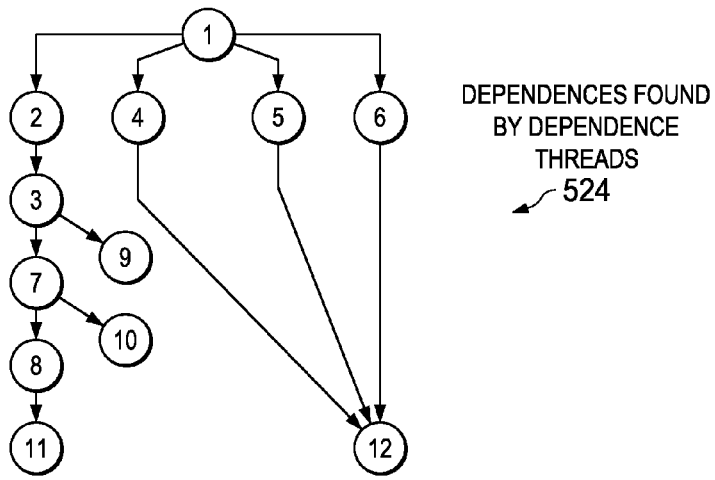

FIGS. 5A-5C depict an example dependence-aware scheduling mechanism in accordance with one illustrative embodiment. Dependence-aware scheduling 500 is performed in a multithreaded execution environment. With dependence-aware scheduling 500, a compiler processes original code 502 to produce augmented original code 504, transformed original code 506, and dependence checking code 508. Original code 502 is what is originally provided to be compiled and run without dependence-aware scheduling. Original code 502 should produce the desired results. Augmented original code 504 is executed on main thread 510 of the multithreaded execution environment. Augmented original code 504 is original code 502 augmented with control and communication code such that the scheduler thread 522 can control the main thread 510.

Transformed original code 506 runs on worker threads 512. Transformed original code 506 is essentially a subset of iterations that are able to communicate with the scheduler thread 522. Dependence checking code 508 is extracted for each particular loop body as a dependence slice that only involves cross-iteration memory accesses. Dependence checking code 508 is used to analyze dependences by the dependence computation module 520 on dependence threads 514. The generation of the dependence checking follows static slicing techniques. Since the illustrative embodiments are only interested in memory accesses that may cause loop-carried dependences, such instructions are identified in original code 502. Next, dependence computation module 520 executes dependence checking code 508 on dependence threads 514 to identify all instructions that a memory access depends on in each dependence slice. This includes both control and data dependences. This process continues recursively until all instructions that the memory access depends on, directly or indirectly, are part of the dependence slice.

Figure 6:
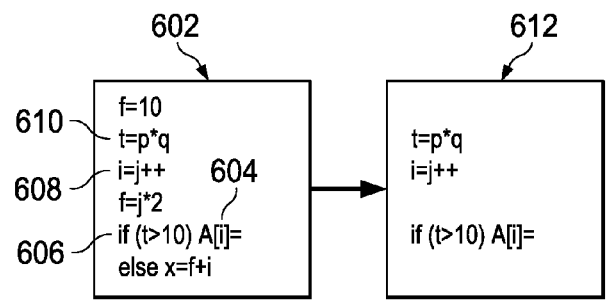
FIG. 6 depicts an example of determining a dependence slice from the loop body of code in accordance with an illustrative embodiment.

FIG. 6 depicts an example of determining a dependence slice from the loop body of code in accordance with one illustrative embodiment. In loop body 602, memory access A[i] 604 is first identified as the memory access that could cause loop-carried dependences. A[i] 604 is control-dependent on conditional branch 606; therefore, conditional branch 606 is part of the slice. Similarly, the computation of i 608 and t 610 must be in the dependence slice as well, since they define values that are used by instructions already present in the slice. Eventually, all irrelevant instructions are removed, leaving only the dependence slice 612.

Typically, a loop contains multiple memory accesses that could lead to loop-carried dependences. The dependence slice with regard to those memory accesses may be merged together to form the complete dependence slice. Eventually, a dependence checking code is generated. The dependence checking code takes a parameter, e.g., the iteration number, and returns a list of accessed memory addresses as well as the type of the access (read or write).

FIG. 7 depicts an example of building a dependence checking code for the Unstructured Mesh of Transport (UMT) benchmark described above in accordance with one illustrative embodiment. To build a dependence slice as described in FIG. 6, all memory accesses that may cause dependences are stored in a linked list, which will be returned by the function. Therefore, in UMT benchmark 700 such memory accesses are replaced by statements 702, 704, 706, 708, and 710 that add new elements to the linked list. The linked list is thus, populated with memory access information for tracking dependences of the dependence slice. The linked list is a temporary storage that is used by the dependence checking function to return a list of memory accesses within a particular iteration.

Returning to FIGS. 5A-5C, main thread 510 executes augmented original code 504. Main thread 510 executes each loop in augmented original code 504 sequentially and checks with scheduler thread 522 after the execution of each iteration in the loop whether the next iteration should be executed or skipped. During early stages of the execution of a particular loop on main thread 510, scheduler thread 522 executes dependence checking code on dependence threads 514 to run computations to identify dependence distances within the loop so that iterations may be executed in parallel.

Because computing dependences at runtime is a net overhead, dependence computation module 520 attempts to perform computations on dependence threads 514 as cheaply as possible and at a faster rate than main thread 510, otherwise the information will be too late to help speedup main thread 510. Dependence computation module 520 scales the computations to one or more threads, and possibly to as many threads that are available in the data processing system, in order to shorten the total execution time.

To compute dependence relationships, dependence computation module 520 executes dependence checking code on dependence threads 514. In one embodiment, dependence threads 514 allocate a temporary array for each array accessed in the loop body that might involve loop-carried dependences. These temporary arrays may be referred to as version arrays, which records which iterations have accessed the particular element. For a write operation to a particular array, dependence computation module 520 only tracks the last write operation because the last write operation overwrites or kills all previous writes. For a read operation of a particular array, dependence computation module 520 maintains a list of iterations that read the data until a write operation to the particular array occurs. At this point dependence computation module 520 removes all reads from the version array of the particular array. In this manner, all three types of dependences: flow dependence, anti dependence, and output dependence are taken care of. Flow dependence is a read-after-write dependence, anti dependence is a write-after-read dependence, and output dependence is a write-after-write dependence. In general, a dependence is two or more statements addressing the same memory location.

In one embodiment, dependence computation module 520 calls the dependence checking code of all iterations sequentially. If an iteration writes to a particular array, dependence computation module 520 marks the iteration in the version array of that particular array. If a later iteration reads from the same element, dependence computation module 520 establishes a dependence relationship between the two iterations. Similarly, write-after-read (anti), write-after-write (output) dependences are also detected. There may be multiple arrays being accessed by the loop; therefore, the identified dependence relationships are unions of dependences by all arrays. In another embodiment, the dependences are computed in parallel by two or more threads. In this embodiment, each thread participating in the dependence computation evaluates the dependence checking code assigned to it in a sequential manner. To be conservative, the illustrative embodiments consider iterations assigned to distinct dependence-computing threads to be dependent.

Figure 8:
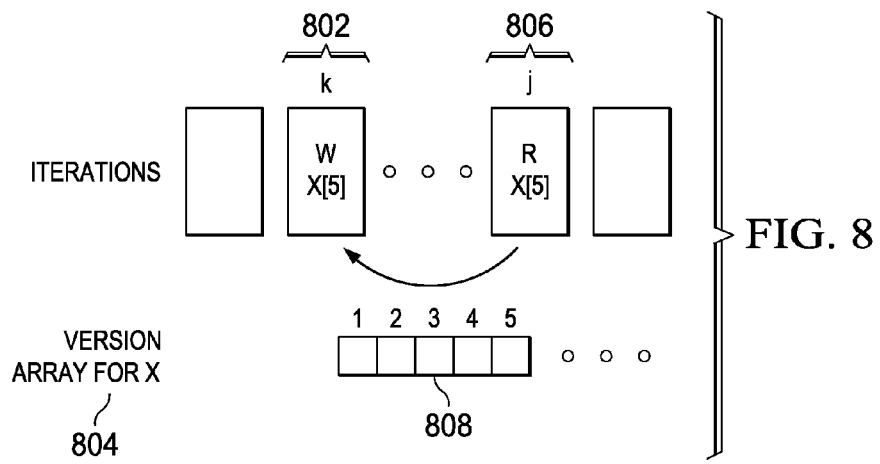
FIG. 8 illustrates an example of deriving a dependence using the dependence checking code in accordance with an illustrative embodiment.

FIG. 8 illustrates an example of deriving a dependence using the dependence checking code in accordance with one illustrative embodiment. In this example, iteration k 802 first writes data to array X's fifth element and then iteration j 806 reads the data from array X's fifth element. By identifying the order and type of memory accesses performed by iterations 802 and 806, a dependence computation module constructs a dependence edge from iteration j 806 to iteration k 802. As will be detailed later, a version array for array X 804 is created and the fifth element of the version array 808 is marked accordingly to identify this dependence.

Returning to FIGS. 5A-5C, to further reduce space overhead, the illustrative embodiments determine how much room is available to move an iteration ahead of time. That is, dependence computation module 520 identifies only the closest iteration that the current iteration depends on. Therefore, the version array can only record the iteration number of the last read or write access. Also, dependence computation module 520 keeps a dependence distance for each iteration, which is the nearest iteration it depends on. This succinct representation also helps the scheduler to quickly schedule iterations. Dependence computation module 520 then transfers the identified dependence distances to scheduler thread 522. An example of dependences that may be identified by dependence computation module 520 is shown in Directed Acyclic Graph (DAG) 524 in FIG. 5C.

As mentioned previously, during early stages of the execution of a particular loop on main thread 510, scheduler thread 522 requests dependence computation module 520 executing dependence checking code on dependence threads 514 to run computations to identify dependence distances within the loop so that iterations may be executed in parallel. During the time when the dependence computation module 520 is computing the dependence distances, scheduler thread 522 waits, at runtime, for the dependence computation to finish. Once the scheduler thread 522 receives the dependence distance for each iteration, scheduler thread 522 determines which iterations may have already been executed on main thread 510, because main thread 510 executes iterations in parallel to the computation of dependences by dependence computation module 520. By the time dependence computation module 520 finishes dependence computation, main thread 510 has already executed for a while. If one or more iterations have been executed by main thread 510, scheduler thread 522 simply ignores those early executed iterations. Scheduler thread 522 then schedules those incomplete iterations that have enough room for ahead-of-time execution and signals worker threads 512 to execute and for main thread 510 to skip the particular iterations.

As is shown in FIG. 5B, dependence computation module 520 has identified that iterations 4, 5, 6, 9, and 10 are independent and may be executed on one or more worker threads 512. Scheduler thread 522 then schedules worker threads 512 to execute iterations 4, 5, 6, 9, and 10, and schedules main thread 510 to skip iterations 4, 5, 6, 9, and 10. The synchronization may be performed through a bit-vector, which uses a bit to represent each iteration, through other inter-thread communication mechanisms, or the like. A lock may be needed to ensure atomic operations to the bit-vector, if the bit-vector is implemented. Finally, as mentioned earlier, the scheduler thread 522 may be a standalone thread that synchronizes itself with the other threads.

In dependence-aware scheduling mechanism 500, dependence threads 514 may start arbitrarily as early as possible in a given application. In addition, there may be one or more of dependence threads 514, dependence threads 514 and worker threads 512 may or may not be the same, there may be different numbers of dependence threads 514 than worker threads 512, and scheduler thread 522 may be present or worker threads 512/main thread 510 may be self-scheduling.

If it can be established that, for a given set of iterations, the dependences have not changed from a prior execution of the same set of iterations, then it is possible to reuse the previously computed dependences and skip the computations of the dependences entirely. Sometimes it is possible to detect in a given application that dependences have not changed by determining that key data structures have not been modified. In such a case, it is sufficient to determine that such key data structures have not changed to ensure that the last computed dependence graph is still valid. Using this scheme, an application that changes key data-structures only once per phase (e.g., every 100th time that the set of iterations is computed) will incur the dependence computing overhead only once per phase.

There are many possible embodiments for scheduler thread 522. Scheduler thread 522 may be implemented as a library, which is called by the main thread 510 and dependence computation threads 514. Alternatively, scheduler thread 522 may be run on a separate thread which then communicates with other threads. Scheduler thread 522 takes dependency information after calculation through an inter-thread communication mechanism and decides which iterations can be scheduled to be executed earlier. Scheduler thread 522 also informs the main thread 510 to skip some of the iterations that have already been scheduled earlier through inter-thread communication.

There may be no guarantee that the dependence calculation will reveal actual opportunities for scheduler thread 522 to schedule some of the iterations early. If the dependences are very tight, for example, each iteration depends on the previous iteration, the loop may only be executed sequentially. However, by calculating the dependences, an upfront cost of computation is paid. Some of this cost may be associated with possible interference with the main thread 510. Therefore, it is important that the dependence computation's interference with the main thread 510 be kept as small as possible.

Thus, the illustrative embodiment provide for a dependence-aware scheduling of independent iterations so that the independent iterations are scheduled and executed ahead of time in parallel with other iterations. Unused threads or threads on cores on a multi-core chip are used to compute dependences within a loop as the loop executes. The thread or threads on one or more cores feed this information to a scheduler that is able to parallelize some of the iterations across other threads operating simultaneously. Computing dependences within a loop as the loop executes allows loops that are otherwise not parallelizable to be parallelized.

Figures 9, 10:
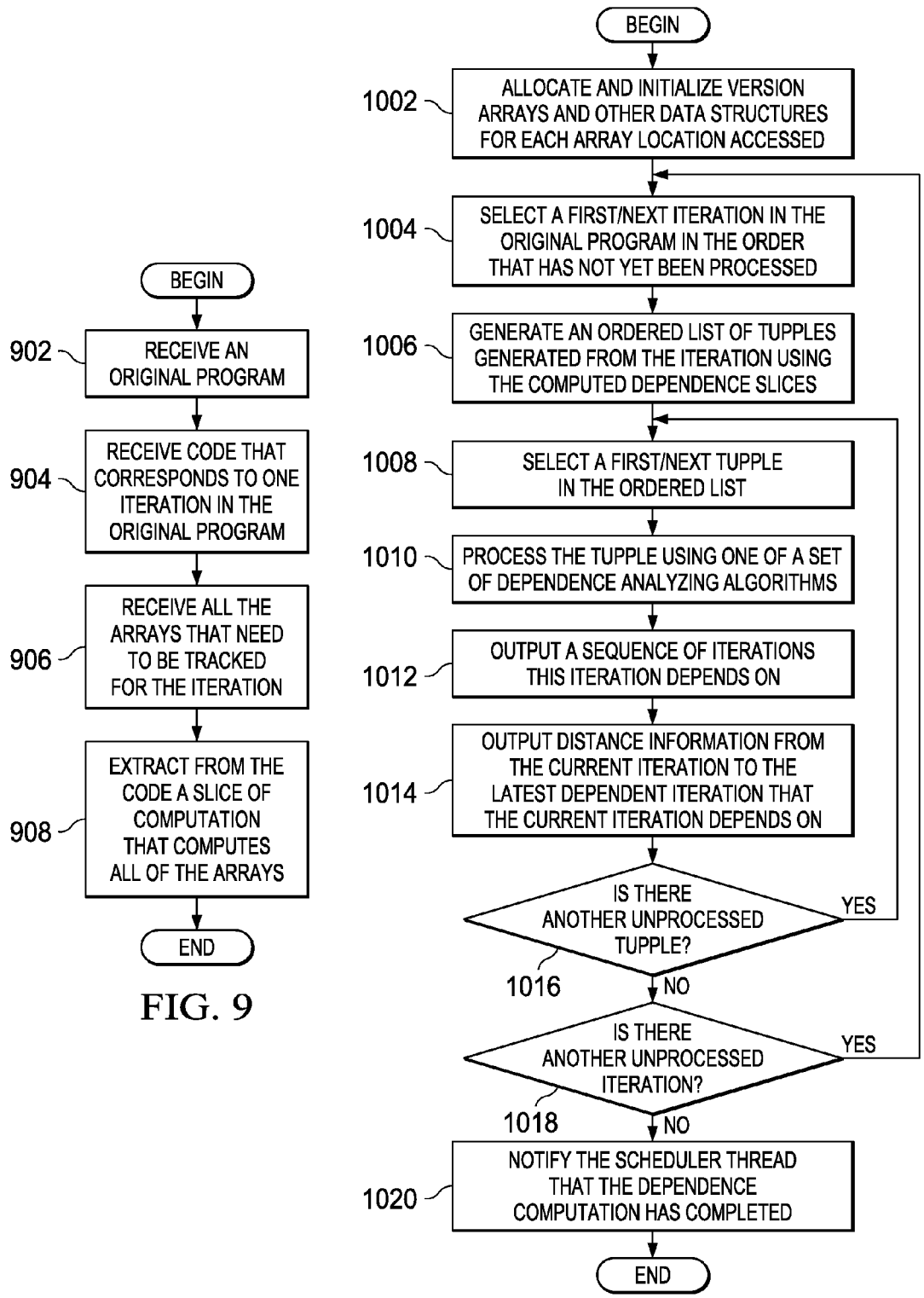
FIG. 9 depicts an example of the operation performed by a compiler of a dependence-aware scheduling mechanism in accordance with an illustrative embodiment.
FIG. 10 depicts an example of the operation performed by a dependence computation module of a dependence-aware scheduling mechanism at runtime in accordance with an illustrative embodiment.

FIG. 9 depicts an example of an operation performed by a compiler of a dependence-aware scheduling mechanism in accordance with one illustrative embodiment. As the operation begins, a compiler receives an original program that is to be executed (step 902). The compiler also receives code that corresponds to one loop iteration in the original program (step 904). The illustrative embodiments note that the referred to "code that corresponds to one loop iteration" may be a unit of work that is to be executed atomically by the main thread 510 or the worker threads 512. The term "loop iteration" simply indicates that, often, a loop iteration in original code 502 is a meaningful unit of work. However, the term "loop iteration" may also refer to multiple loop iterations in the code, or subset of a single loop iteration in the code, as a unit of work.

The compiler also receives all the arrays that need to be tracked for the iteration (step 906). The compiler then extracts from the code a slice of computation that computes all of the arrays for the arrays that need to be tracked for the iteration (step 908), with the operation ending thereafter. The output of the extraction is an ordered set of accessed array locations, namely an ordered list of tupples (array, location within array, type of access, e.g., read or write, or the like), where the tupples are ordered in the order in which they are encountered in the original program.

FIG. 10 depicts an example of the operation performed by a dependence computation module of a dependence-aware scheduling mechanism at runtime in accordance with an illustrative embodiment. As the operation begins, the dependence computation module allocates and initializes version arrays and other data structures for each array location accessed by the original program (step 1002), which is further described in FIGS. 11A-11B, 12A-12B, and 13 that follow. The dependence computation module then selects the first iteration in the original program in the order that has not yet been processed (step 1004). The dependence computation module then generates an ordered list of tupples from the iteration i using the computed dependence slices (step 1006). The dependence computation module then selects the first tupple in the ordered list (step 1008). The dependence computation module processes the tupple using one or a set of dependence analyzing algorithms (step 1010), which will be described in FIGS. 11A-11B, 12A-12B, and 13 that follow.

Once the tupple has been processed, the dependence computation module outputs a sequence of iterations this iteration depends on (step 1012). The dependence computation module also outputs distance information from the current iteration to the latest dependent iteration that the current iteration depends on (step 1014). The dependence computation module then determines if there is another unprocessed tupple in the iteration (step 1016). If at step 1016 there is another unprocessed tupple, then the operation returns to step 1008. If at step 1016 there is not another unprocessed tupple, then the dependence computation module determines if there is another unprocessed iteration in the original program step 1018. If at step 1018 there is another unprocessed iteration, then the operation returns to step 1004. If at step 1018 there is not another unprocessed iteration, then the dependence computation module notifies the scheduler thread that the dependence computation has completed (step 1020).

Figure 11A:
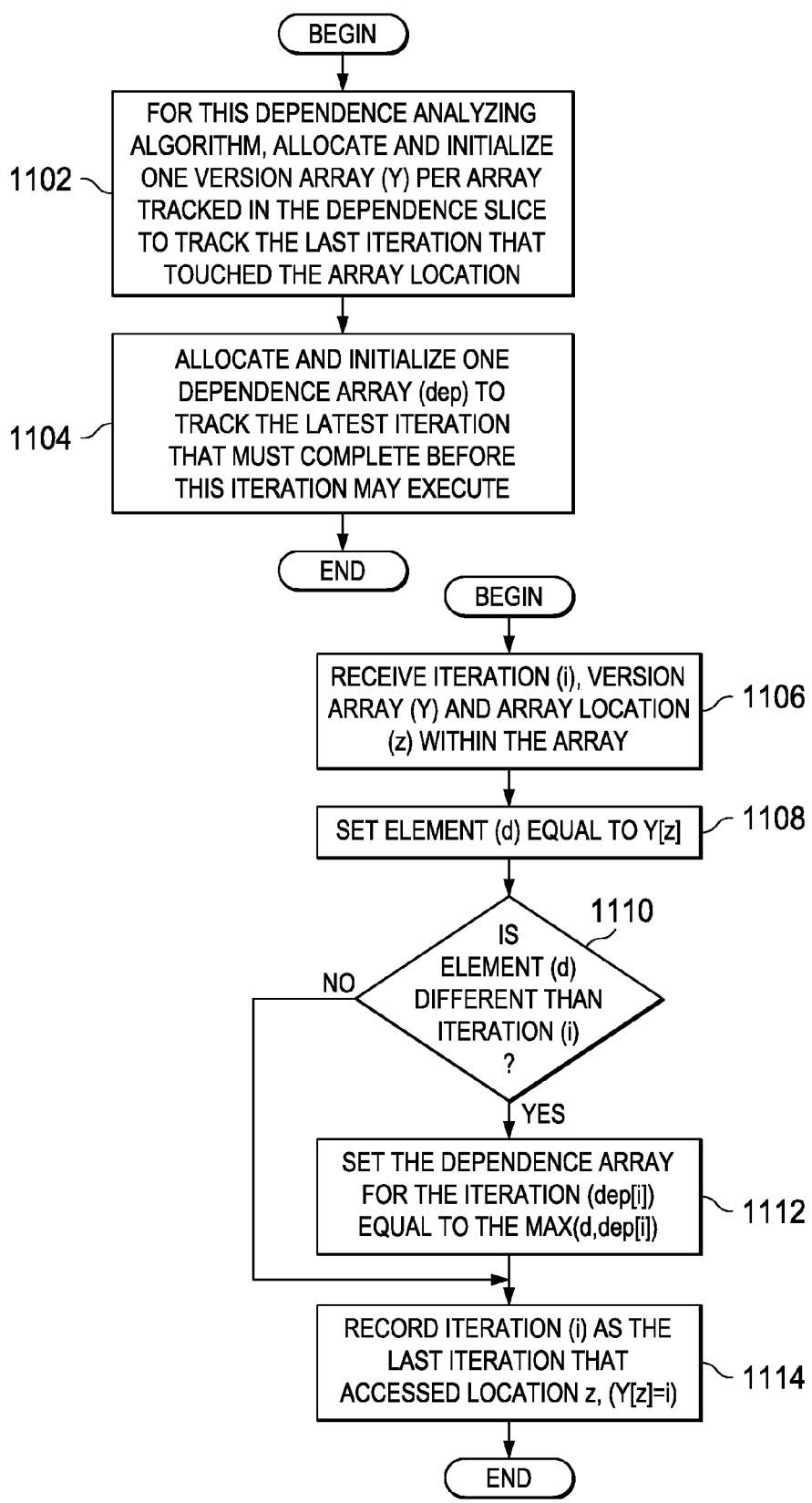
FIG. 11A depicts one example of a dependence analyzing algorithm that may be executed by a dependence computation module in accordance with an illustrative embodiment.

FIG. 11A depicts one example of a dependence analyzing algorithm that may be executed by a dependence computation module in accordance with one illustrative embodiment. This example of the dependence analyzing algorithm is an instance where an approximate dependence graph is built using a last access representation. For this dependence analyzing algorithm, as the operation begins, the dependence computation module allocates and initializes one version array Y per array tracked in the dependence slice to track the last iteration that touched, either through a read or a write, that array location (step 1102). An example of suitable initial values is as follows. If the iteration is part of a loop that iterates from 0 to N, then suitable initial values are numbers smaller than 0 (i.e. smaller than the lower bound). This smaller value is then interpreted as an array value not having been touched yet within the scope of the loop. The dependence computation module also allocates and initializes one dependence array dep to track the latest iteration that must complete before this iteration may execute (step 1104), with the operation ending thereafter. Suitable initial values are the same as for the initial values for the version arrays. Steps 1102 and 1104 are the specific operations performed for this example of the dependence analyzing algorithm which correspond to step 1002 of FIG. 10.

Likewise, the description of steps 1106 through 1114 expand on the operation performed by dependence computation module in step 1010 of FIG. 10. Once the data structures and version arrays have been allocated, the dependence computation module receives iteration i, version array Y, and array location z within the array (step 1106). The dependence computation module then sets element d equal to Y[z] (step 1108). Then, the dependence computation module determines if element d is different than iteration i (step 1110). If at step 1110 element d is different than iteration i, then dependence computation module sets the dependence array for the iteration dep[i] equal to the maximum of either element d or dependence array for the iteration dep[i] (step 1112). From step 1112 or if at step 1110 element d is not different than iteration i, then dependence computation module records iteration i as the last iteration that accessed location z (Y[z]=i) (step 1114), with the operation performed by this example of a dependence analyzing algorithm terminating thereafter.

Figure 11B:
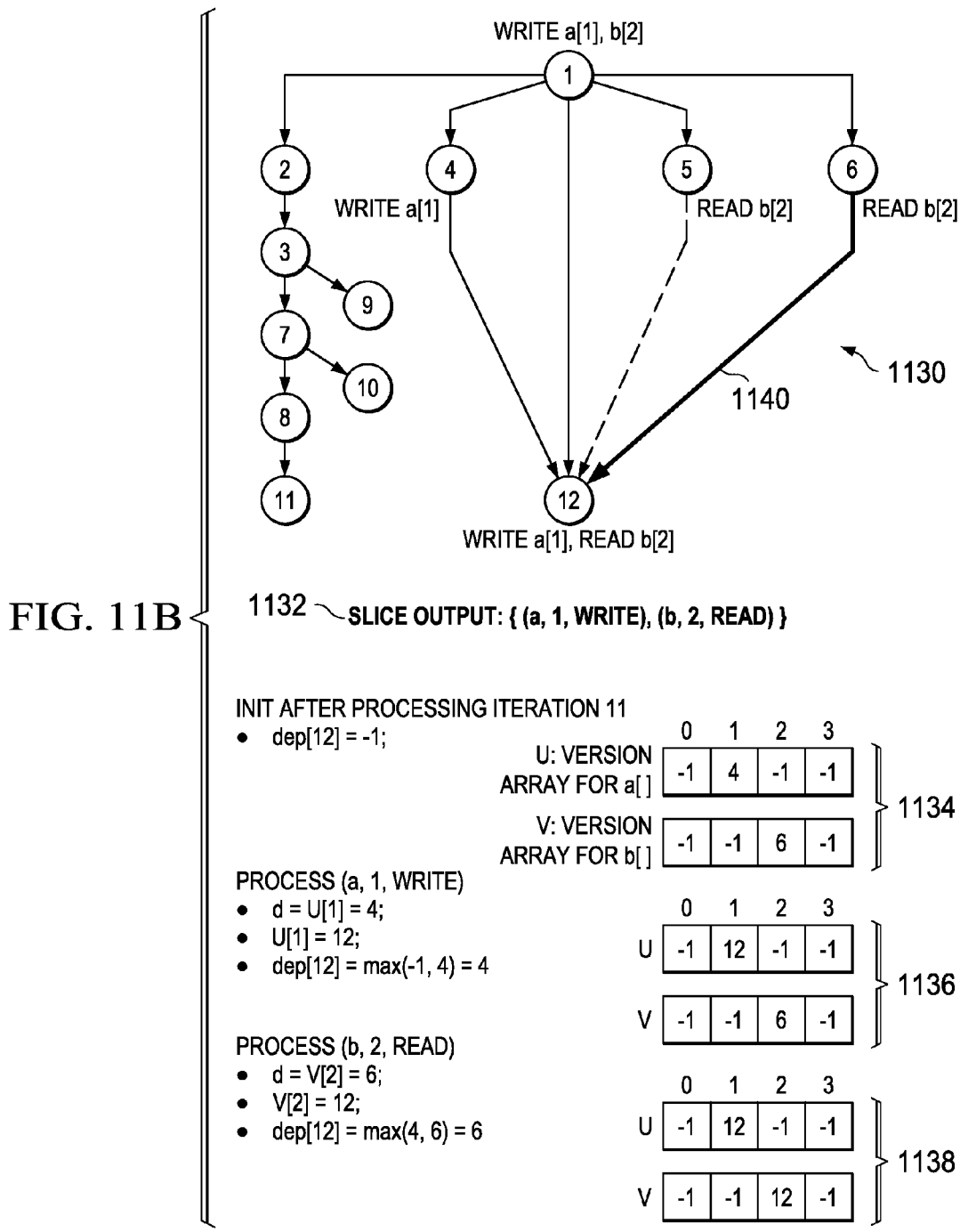
FIG. 11B depicts an example of the dependence analyzing algorithm described in FIG. 11A in accordance with an illustrative embodiment.

FIG. 11B depicts an example of the dependence analyzing algorithm described in FIG. 11A in accordance with one illustrative embodiment. In this illustration, the dependence computation module determines the dependency of iteration 12 as shown in dependence graph 1130. The dependence computation module receives dependence slice output 1132 from a compiler that indicates that iteration 12 writes to array a array location 1, a[1], and reads from array b array location 2, b[2]. After processing iteration 11, the dependence computation module sets the dependence of iteration 12 dep[12] equal to −1, which indicates that no dependence has been identified. Version arrays 1134 represent the temporary array for each array accessed in the loop body that might involve loop-carried dependences. Version array U is the version array for array a accessed by the loop body in the original program and version array V is the version array for array b accessed by the loop body accessed in the original program.

As the dependence computation module executes this dependence analyzing algorithm, the dependence computation module processes the first access which is a write to array a location 1. The dependence computation module sets element d equal to 4, which is the current iteration indicated in version array U location 1, U[1]. The dependence computation module also sets U[1] equal to 12 as the last iteration to access that array and location as is shown in version arrays 1136. The dependence computation module then sets the dependence of iteration 12 dep[12] equal to the maximum between the previous dependence of iteration 12, which is −1, and the element d, which is 4. Thus, the dependence of iteration 12 dep[12] is set to 4.

The dependence computation module then processes the next access which is a read to array b location 2. The dependence computation module sets element d equal to 6, which is the current iteration indicated in version array V location 2. The dependence computation module also sets V[2] equal to 12 as the last iteration to access that array and location as is shown in version arrays 1138. The dependence computation module then sets the dependence of iteration 12 dep[12] equal to the maximum between the previous dependence of iteration 12, which is 4, and the element d, which is 6. Thus, the dependence of iteration 12 dep[12] is set to 6. Edge 1140 depicts the equivalence of the dependence of iteration 12 dep[12] being set to 6.

Figure 12A:
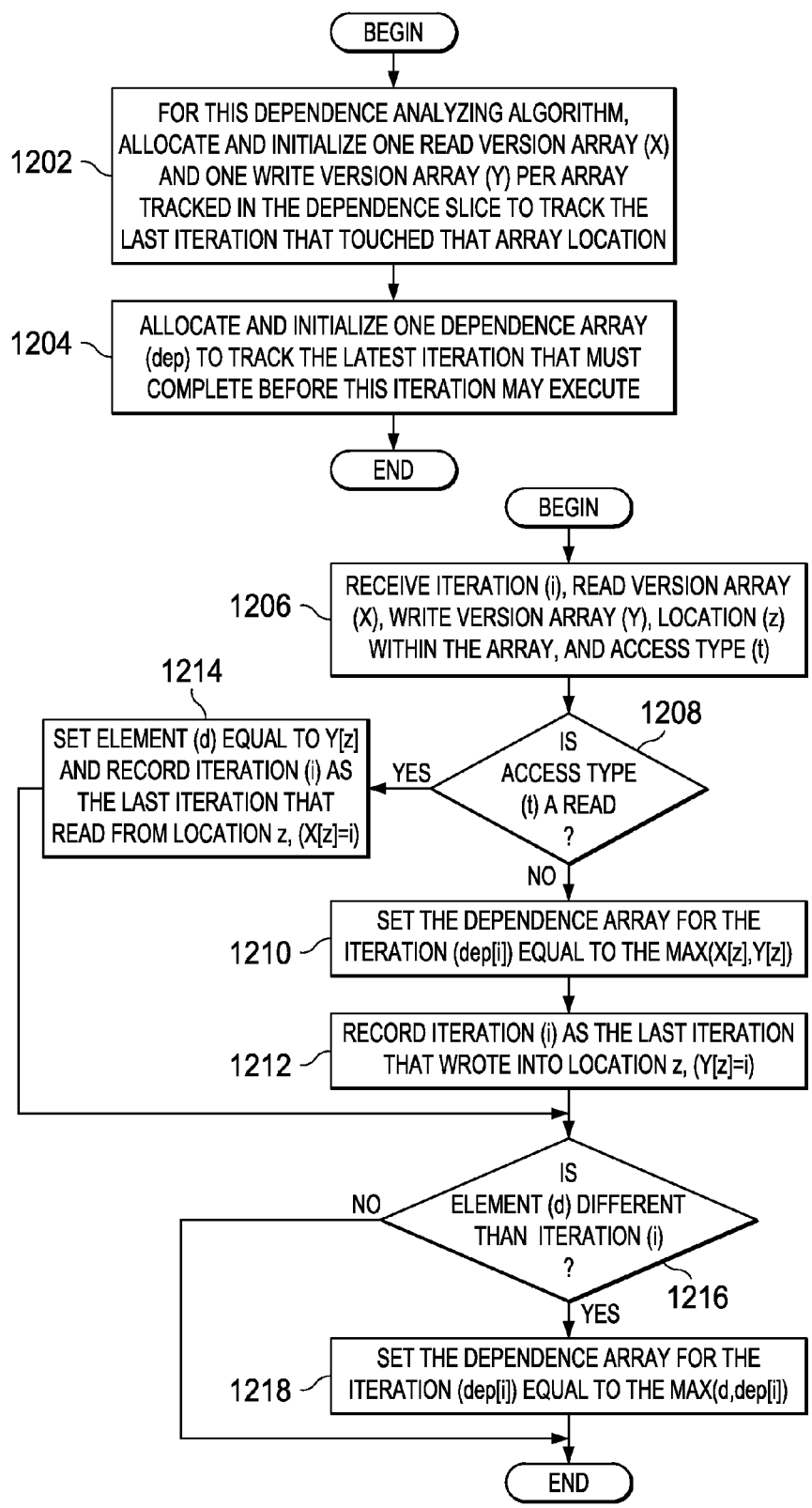
FIG. 12A depicts another example of a dependence analyzing algorithm that may be executed by a dependence computation module in accordance with an illustrative embodiment.

FIG. 12A depicts another example of a dependence analyzing algorithm that may be executed by a dependence computation module in accordance with one illustrative embodiment. This example of the dependence analyzing algorithm is an instance where an approximate dependence graph is constructed using a representation that keeps track of a last read access and a last write access. For this dependence analyzing algorithm, as the operation begins, the dependence computation module allocates and initializes one read version array X and one write version array Y per array tracked in the dependence slice to track the last iteration that touched, either through a read or a write, that array location (step 1202). The dependence computation module also allocates and initializes one dependence array dep to track the latest iteration that must complete before this iteration may execute (step 1204), with the operation terminating thereafter. Steps 1202 and 1204 are the specific operations performed for this example of the dependence analyzing algorithm which correspond to step 1002 of FIG. 10. Suitable initial values are similar to initial values used for steps 1102 and 1104 in FIG. 11.

Likewise, the description of steps 1206 through 1218 expand on the operation performed by dependence computation module in step 1010 of FIG. 10. Once the data structures and version arrays have been allocated, the dependence computation module receive iteration i, read version array X, write version array Y, array location z within the array, and access type t (step 1206). The dependence computation module then determines if access type t is a read access (step 1208). If at step 1208 the access type t is not a read access, then the dependence computation module sets the dependence array for the iteration dep[i] equal to the maximum of either read version array X location z, N[z], or write version array Y location z, Y[z] (step 1210). The dependence computation module then records iteration i as the last iteration that wrote into location z (Y[z]=i) (step 1212). If at step 1208 the access is a read access, the dependence computation module sets element d equal to Y[z] and record iteration i as the last iteration that read from location z (X[z]=i) (step 1214).

From step 1212 or step 1214, the dependence computation module determines if element d is different than iteration i (step 1216). If at step 1216 element d is different than iteration i, then dependence computation module sets the dependence array for the iteration dep[i] equal to the maximum of either element d or dependence array for the iteration dep[i] (step 1218). From step 1218 or if at step 1216 element d is not different than iteration i, with the operation performed by this example of a dependence analyzing algorithm terminating thereafter.

Figure 12B:
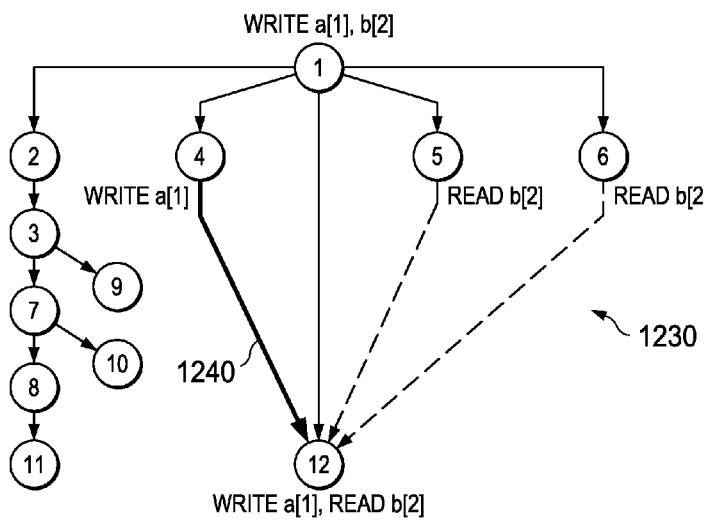
FIG. 12B depicts an example of the dependence analyzing algorithm described in FIG. 12A in accordance with an illustrative embodiment.

FIG. 12B depicts an example of the dependence analyzing algorithm described in FIG. 12A in accordance with an illustrative embodiment. In this illustration, the dependence computation module is determining the dependency of iteration 12 as shown in dependence graph 1230. The dependence computation module receives dependence slice output 1232 from a compiler that indicates that iteration 12 writes to array a array location 1, a[1], and reads from array b array location 2, b[2]. After processing iteration 11, the dependence computation module sets the dependence of iteration 12 dep[12] equal to −1, which indicates that no dependence has been identified. Version arrays 1234 represent the temporary array for each array accessed in the loop body that might involve loop-carried dependences. Version array Ur is the read version array for array a accessed by the loop body in the original program and version array Uw is the write version array for array a accessed by the loop body accessed in the original program. Version array Vr is the read version array for array b accessed by the loop body in the original program and version array Vw is the write version array for array b accessed by the loop body accessed in the original program.

As the dependence computation module executes this dependence analyzing algorithm, the dependence computation module processed the first access which is a write to array a location 1. The dependence computation module sets element d equal to the maximum between read version array Ur location 1, Ur[1], and write version array Uw location 1, Uw[1], which is the maximum between 4 and −1. Thus, element d is set equal to 4. The dependence computation module also sets Uw[1] equal to 12 as the last iteration to access that array and location as is shown in version arrays 1236. The dependence computation module then sets the dependence of iteration 12 dep[12] equal to the maximum between the previous dependence of iteration 12, which is −1, and the element d, which is 4. Thus, the dependence of iteration 12 dep[12] is set to 4.

The dependence computation module then processes the next access which is a read to array b location 2. The dependence computation module sets element d equal to 1, which is the current iteration indicated in write version array Vw location 2. The dependence computation module also sets Vr[2] equal to 12 as the last iteration to access the read version array and location as is shown in version arrays 1238. The dependence computation module then sets the dependence of iteration 12 dep[12] equal to the maximum between the previous dependence of iteration 12, which is 4, and the element d, which is 1. Thus, the dependence of iteration 12 dep[12] is set to 4. Edge 1240 depicts the equivalence of the dependence of iteration 12 dep[12] being set to 4.

Figure 13:
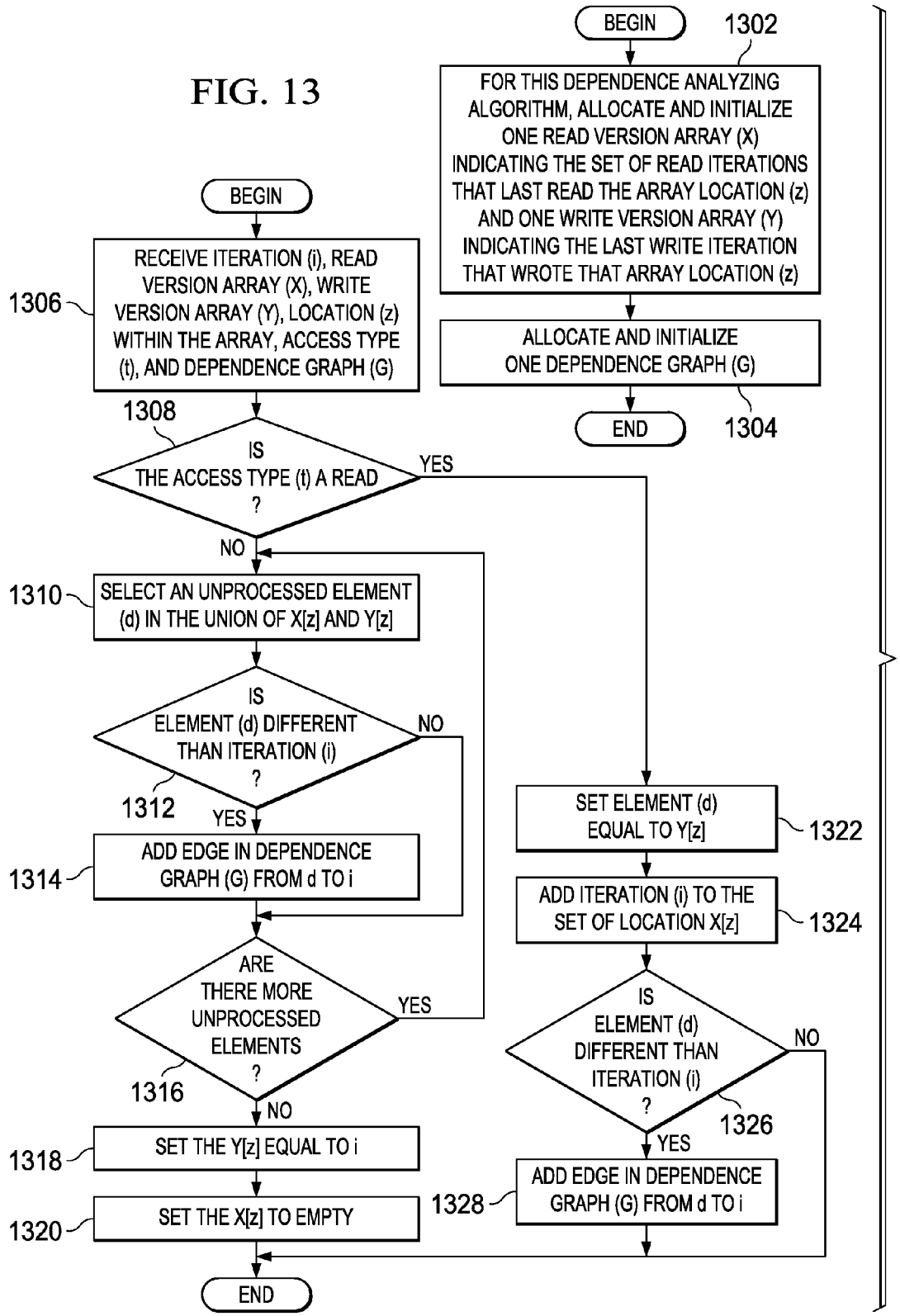
FIG. 13 depicts a third example of a dependence analyzing algorithm that may be executed by a dependence computation module in accordance with an illustrative embodiment.

FIG. 13 depicts a third example of a dependence analyzing algorithm that may be executed by a dependence computation module in accordance with an illustrative embodiment. This example of the dependence analyzing algorithm is for instance when there is a dependence graph. For this dependence analyzing algorithm, as the operation begins, the dependence computation module allocates and initializes one read version array X indicating the set of read iterations that last read the array location z and one write version array Y indicating the last write iteration that wrote that array location z (step 1302). Suitable initial values are the same as the ones used in step 1102 in FIG. 11. The dependence computation module also allocates and initializes one dependence graph G (step 1304), with the operation ending thereafter. The graph is initialized as having one node per iteration and no dependence edges among iterations. Steps 1302 and 1304 are the specific operations performed for this example of the dependence analyzing algorithm which correspond to step 1002 of FIG. 10.

Likewise, the description of steps 1306 through 1324 expand on the operation performed by dependence computation module in step 1010 of FIG. 10. Once the data structures and version arrays have been allocated, the dependence computation module receives iteration i, read version array X, write version array Y, array location z within the array, access type t, and dependence graph G (step 1306). The dependence computation module then determines if the access type t is a read access (step 1308). If at step 1308 the access type t is not a read access, then the dependence computation module selects an unprocessed element d in the union of X[z] and Y[z] (step 1310). The dependence computation module then determines if element d is different than iteration i (step 1312). If at step 1312 element d is different than iteration i, then dependence computation module adds an edge in dependence graph G from element d to iteration i (step 1314). From step 1314 or if at step 1312 element d is not different than iteration i, the dependence computation module then determines if there are more unprocessed elements (step 1316). If at step 1316 there are more unprocessed elements, then the operation returns to step 1310. If at step 1316 there are no more unprocessed elements, then the dependence computation module sets the Y[z] equal to iteration i (step 1318) and sets X[z] equal to empty (step 1320) with the operation performed by this example of a dependence analyzing algorithm terminating thereafter.

Returning to step 1308, if at step 1308 the access type t is a read access, the dependence computation module sets element d equal to Y[z] (step 1322). The dependence computation module adds iteration i to the set of location X[z] (step 1324). The dependence computation module then determines if element d is different than iteration i (step 1326). If at step 1326 element d is different than iteration i, then dependence computation module adds an edge in dependence graph G from element d to iteration i (step 1328). From step 1328 or if at step 1326 element d is not different than iteration i, then the operation performed by this example of a dependence analyzing algorithm terminates.

Figure 14:
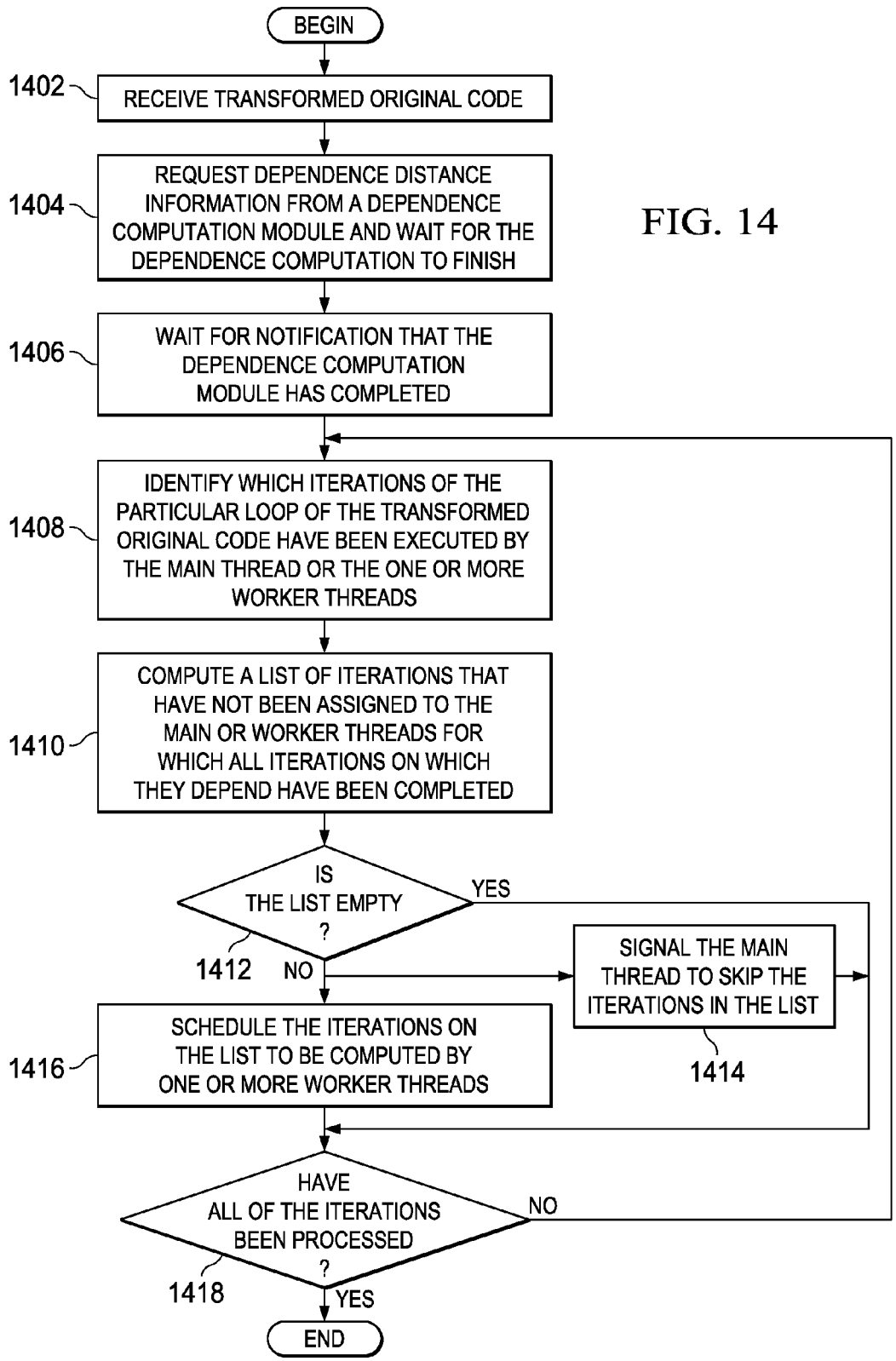
FIG. 14 depicts an example of the operations performed by a scheduler thread of a dependence-aware scheduling mechanism in accordance with an illustrative embodiment.

FIG. 14 depicts an example of the operations performed by a scheduler thread of a dependence-aware scheduling mechanism in accordance with an illustrative embodiment. As the operation begins, a scheduler thread receives transformed original code (step 1402). The scheduler thread requests dependence distance information from a dependence computation module and waits for the dependence computation to finish (step 1404). The scheduler thread then waits for a notification that the dependence computation module has completed (step 1406). Once the notification has been received, the scheduler thread identifies which iterations of the particular loop of the transformed original code have been executed by the main thread or one or more worker threads (step 1408). The scheduler thread computes a list of iterations that have not been assigned to the main or worker threads for which all iterations on which they depend have been completed (step 1410).

The scheduler thread then determines if the list of iterations is empty (step 1412). If at step 1412 the list is non-empty, the scheduler thread signals the main thread to skip the iterations in the list (step 1414) and the scheduler schedules the iterations on the list to be executed by one or more worker threads (step 1416). From steps 1414 and 1416 or if at step 1412 the list is empty, the scheduler thread then determines if all of the iterations have been processed (step 1418). If at step 1418 all iterations have not been processed, the operation returns to step 1408. If at step 1418 all iterations have been processed, then the operation ends.

Figure 15:
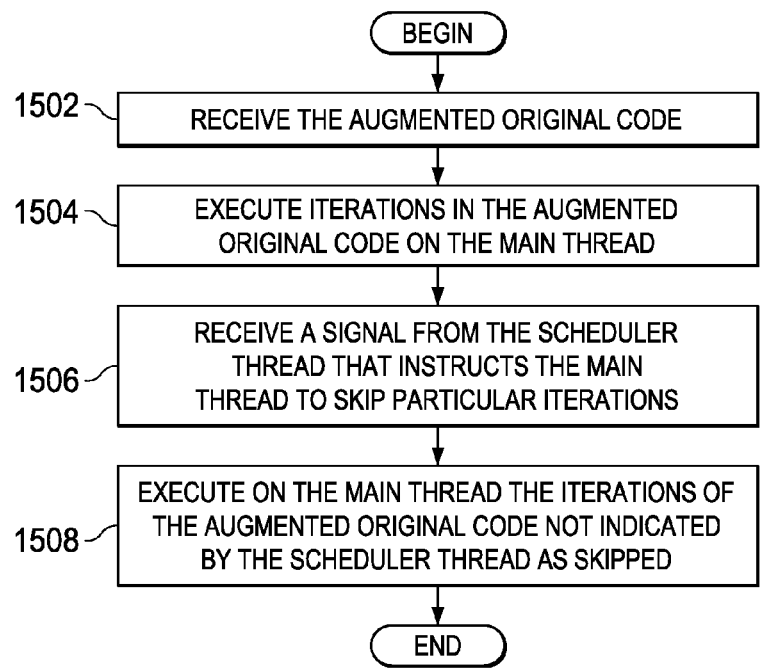
FIG. 15 depicts an example of the operation performed by a main thread and one or more worker threads of a dependence-aware scheduling mechanism in accordance with an illustrative embodiment.

FIG. 15 depicts an example of the operation performed by a main thread and one or more worker threads of a dependence-aware scheduling mechanism in accordance with an illustrative embodiment. As the operation begins, the main thread receives the augmented original code (step 1502). The main thread begins to execute the iterations in the augmented original code on a main thread (step 1504). During the execution, the main thread receives a signal from a scheduler thread that instructs the main thread to skip particular iterations that have been executed ahead-of-time on one or more worker threads in the data processing system (step 1506). Using these signals, the main thread executes only the iterations of the augmented original code not indicated as being skipped by the scheduler thread (step 1508), with the operation ending thereafter. The signal from the scheduler thread may be asynchronous. For example, the scheduler thread simply sets a bit in a bit vector indicating that the particular iteration has been skipped. When main thread reaches the beginning of that iteration, the main thread checks the bit vector and decides to skip the iteration.

Thus, the illustrative embodiments provide mechanisms for a dependence-aware scheduling mechanism that schedules independent iterations so that the independent iterations are scheduled and executed ahead-of-time in parallel with other iterations. Threads or threads on cores in a multi-core chip, other than the main thread which is already executing iterations, are used to compute dependences within a loop as the loop executes. The other threads or threads on cores feed this information to a scheduler thread that is able to parallelize some of the iterations across other threads operating simultaneously. Then, the scheduler thread instructs the main thread to skip some iterations and the scheduler thread schedules the skipped iterations to be executed ahead-of-time.

As described above, the version arrays of the illustrative embodiments record, for each array element in a portion of code being analyzed, the iteration number of its last access as well as additional information. Thus, the size of the version array is in proportion to the size of the array. When accesses are sparse, the version array may be very large and most of its contents may not contain any useful information. Thus, the version arrays may maintain information for determining the full data dependence of all of the iterations of the portion of code being analyzed for all dependence distances, but much of the version arrays may be populated with inessential data that is not actually used for profiling, just-in-time compilation, verification of dependence properties, and optimization purposes. For example, while the version arrays have a storage location for each array element of an array accessed by the code, these storage locations only store useful information when there is an actual dependence. For much of the array accessed by the code, there may not be any dependence and thus, the storage location does not store any useful information in that storage location. Based on observations made be the present inventors, it is often the case that obtaining full data dependence information is not necessary since it is typically sufficient to know dependence/independence among iterations, or units of work, that are sufficiently close to each other, e.g., adjacent iterations or iterations within a specified distance of each other (e.g., within 10 iterations of each other). For instance, if there are only two threads available for parallelization, as long as one iteration can be found to run in parallel with the current iteration, the two threads are fully utilized. In other words, checking only a few iterations often suffices to get a parallelizable iteration.

Thus, as mentioned above, the mechanisms of these further illustrative embodiments operate to reduce the amount of dependence information maintained by the system while still allowing the system to build approximate and safe dependences with very low overhead. The mechanisms of the illustrative embodiment recognize that dependence information may be approximate dependence information, rather than complete dependence information provided by the previous illustrative embodiments described above, as long as certain safety rules are satisfied. Safely approximated dependences means that the dependence information is always safe for optimizations when the following rules are utilized: (1) it is safe to assume a dependence where there is not one; and (2) if, in the true dependence DAG there is an edge A to C, it is safe to have in the approximate dependence information an edge from A to X and another edge from X to C, because dependences are transitive.

The mechanisms of these further illustrative embodiments utilize a self-purging dependence data structure with a limited or fixed look-back window size that limits the amount of dependence information that is stored in the self-purging dependence data structure. That is, rather than utilizing the version arrays described previously, these further illustrative embodiments utilize self-purging dependence data structures to store dependence information for a limited dependence distance. In one illustrative embodiment, the self-purging dependence data structure is a hash table data structure. In another illustrative embodiment, the self-purging dependence data structure is a circular buffer data structure. In both cases, the size of the self-purging dependence data structure is further limited by the number of elements provided within the self-purging dependence data structure. For example, in the hash table data structure, the hash table data structure may be associated with an array A that has m elements and the hash table data structure has a number of hash sets n that is substantially less than m. Thus, multiple array elements may hash to the same hash set.

It should be appreciated that these example self-purging dependence data structures are only meant to be examples and are not intended to state or imply any limitation with regard to the types of data structures that can be used to implement the dependence tracking mechanisms that utilize the moving look-back window of the illustrative embodiments. That is, the present invention is not limited to these types of self-purging dependence data structures or to only self-purging data structures. To the contrary, the scope of the illustrative embodiments are intended to cover any dependence structure that may be used to implement a moving look-back window in accordance with the present invention.

In a first illustrative embodiment, in which a hash table data structure is used as the self-purging dependence data structure, the data dependence identification mechanisms described previously are still implemented but with the dependence data being stored in a self-purging dependence data structure that implements a policy for maintaining a limited amount of dependence data defined by a given window of dependence distances. The hash table data structure is a self-purging data structure that eliminates out-of-window memory events. The hash table data structure contains a list of elements associated with each set of the hash. Each element stores, in addition to the read/write mode and address of the access, the iteration number associated with the access. This iteration number allows the moving look-back window mechanisms to determine, when processing a new access, the dependence distance between the current access attempt and a previous access attempt within the same hash set.

With the moving look-back window mechanism, only the $W^{th}$ last iterations are of interest with regard to maintaining data dependence information, where W is the width or size of the window with regard to dependence distance, i.e. the number of iterations in the past from a current iteration. For example, if the current access occurs in the $10^{th}$ iteration, and the window width or size W is 5 iterations, then the self-purging dependence data structure policy is only interested in maintaining dependence information back to the $5^{th}$ iteration. Any dependence information for iterations prior to the $5^{th}$ iteration will be purged from the self-purging dependence data structure, as described more fully hereafter. Thus, assume that the mechanisms described above process an access and attempt to generate a new entry Y for a current access in a current iteration. In the self-purging dependence data structure (which is used in place of the version arrays discussed above), the self-purging dependence data structure eliminates any element, from the hash set corresponding to the array or memory location, that is associated with iterations prior to Y-W since they have fallen out of the window of dependences of interest.

Figure 16:
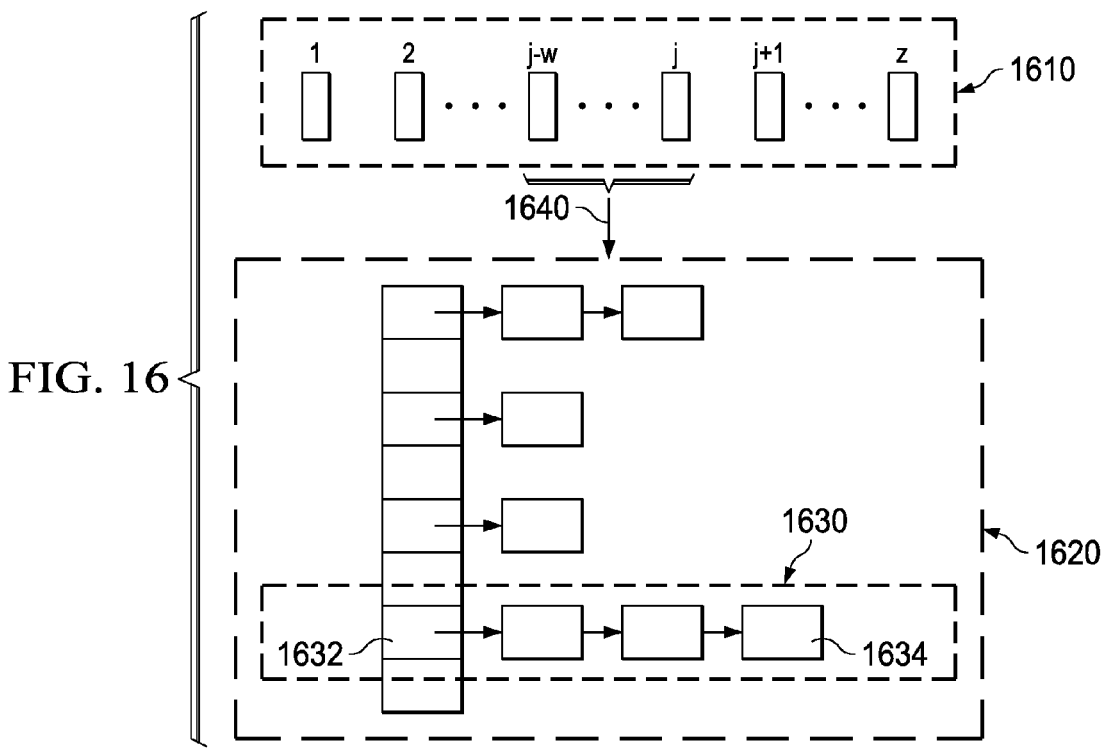
FIG. 16 is an example diagram illustrating the moving look-back window approach implemented as a hash table data structure in accordance with one illustrative embodiment.

FIG. 16 is an example diagram illustrating the moving look-back window approach implemented as a hash table data structure in accordance with one illustrative embodiment. As shown in FIG. 16, the execution of a portion of code may involve a plurality of iterations 1610, e.g., iterations 1 to z in the depicted example. As described in detail above, as these iterations are executed, dependence information for memory accesses of the iterations are identified and tracked by the mechanisms of the illustrative embodiments. With regard to the depicted moving look-back window illustrative embodiment, this dependence information is tracked in a self-purging hash table data structure 1620 that implements a policy of purging access information for iterations outside a defined window of dependence distance having a dependence distance size of w. As shown in FIG. 16, each hash set 1630 in the hash table data structure 1620 has a hash index 1632 and zero or more elements 1634 linked to the hash index 1632 as a linked list. Each element 1634 in the hash table data structure 1620 stores the type of access (e.g., read/write), the address, e.g., array index A[i], of the access for the array corresponding to the hash set, and the iteration of the access. There may be a separate hash table data structure 1620 for each array accessed by the portion of code being analyzed, if the index of the array is stored. Alternatively, only one hash table data structure is needed if the address is stored.

It should be noted that the number n of hash sets in the hash table data structure 1620 is substantially smaller than the size m of the array such that accesses to different entries in the array may, through the hash function, result in the same hash index being identified and dependence information stored in that corresponding hash set 1630. Elements or entries within the hash set 1630 store the information about the access for use in determining dependences within a given moving look-back window of iterations. For example, if the current access is at iteration j, then the moving look-back window 1640 of iterations for which dependence information for the array accessed by the current access is maintained would be between j-w and j as shown in FIG. 16. The self-purging hash table data structure and associated policy automatically purges the hash set of any dependence information for iterations prior to j-w. Such dependence information may be removed from the self-purging hash table data structure 1620 in response to accessing the self-purging hash table data structure 1620 for purposes of creating a new element or entry in the hash set 1630 for the array. An entry or element in the hash set should be removed by the processing of the first access to that array after it falls out of the moving look-back window.

Figure 17A:
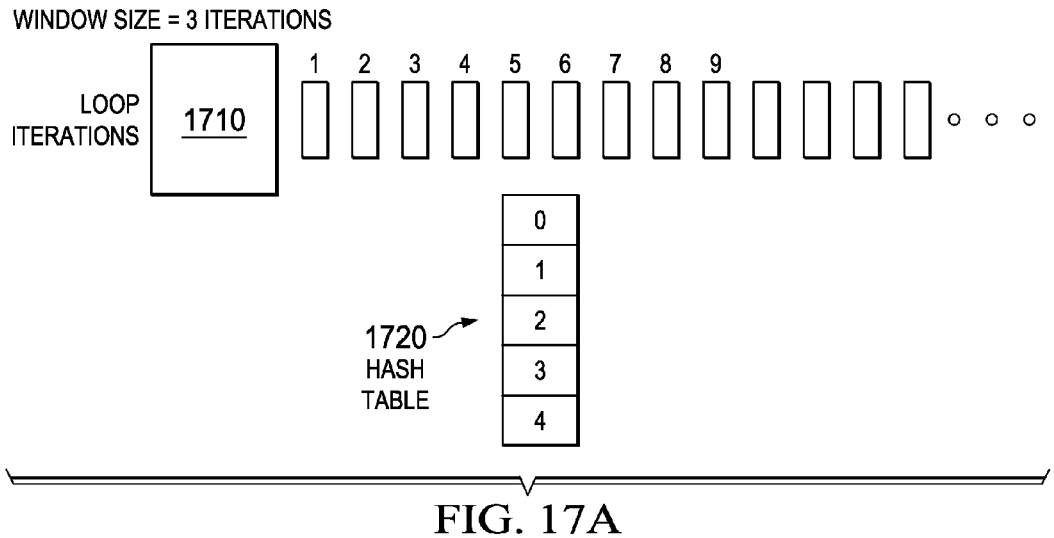
FIGS. 17A-17G are diagrams illustrating an operation of the moving look-back window and the corresponding changes to a self-purging hash table data structure in accordance with one illustrative embodiment.

FIGS. 17A-17G are diagrams illustrating the operations of the moving look-back window and the corresponding changes to a self-purging hash table data structure in accordance with one illustrative embodiment. FIG. 17A illustrates an initial state of the moving look-back window 1710, having a window width or size w of 3 iterations. The self-purging hash table data structure 1720, which may be stored in a memory or storage device of a data processing system implementing the mechanisms of the illustrative embodiments, is initially created for tracking dependence information for array A in the portion of code. The self-purging hash table data structure 1720 is initially empty other than the hash indexes used to track the dependence information for array elements accessed by the portion of code being analyzed. It should be appreciated that while only one hash stable data structure 1720 is shown in FIGS. 17A-17G, the same operation outlined with regard to these figures may be used to track dependencies for multiple arrays accessed by the portion of code over the same or different iterations using additional hash table data structures (not shown). Such tracking can be performed in parallel or in a non-parallel manner to the operations described herein with regard to FIGS. 17A-17G.

Figure 17B:
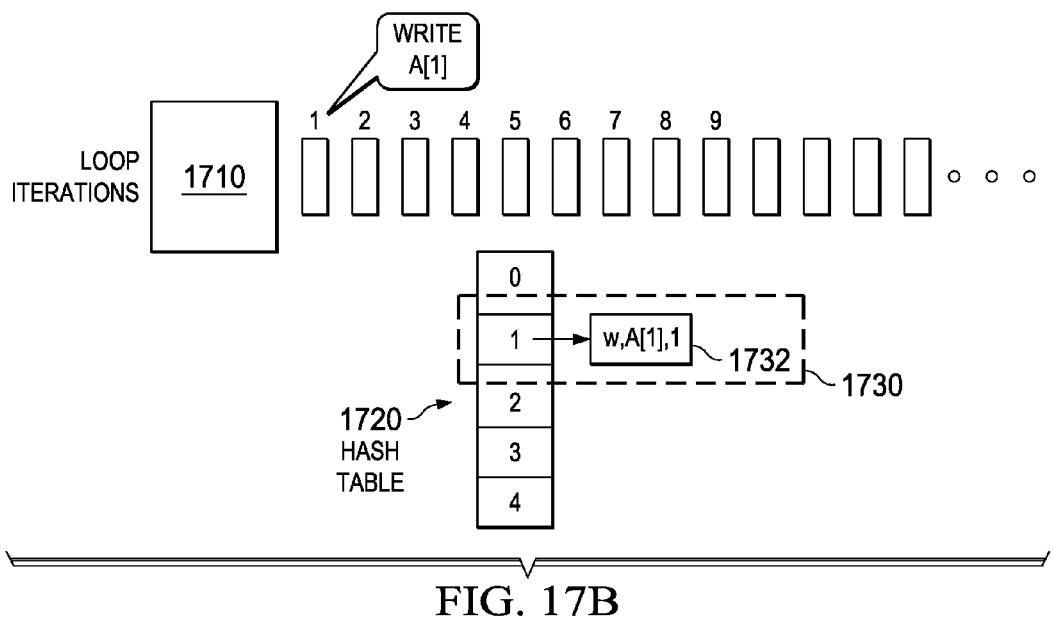

FIG. 17B shows that in the first iteration of the portion of code, a write is performed to the first entry of array A, i.e. a write to A[1]. A hash function is applied to the address, e.g., array index i of array A[i], to determine the hash set 1730 to which the dependence information is to be written. The self-purging hash table data structure 1720 is thus, populated with an element or entry 1732 in a first hash set 1730 indexed by hash index "1." As shown in FIG. 17B, in this depicted example, the hash table data structure 1720 only contains five hash sets with hash indexes of 0 to 4. Thus, a hash function is used to map array indices to hash set indices. If a modulo function is assumed, accesses to elements A[5] and above in the array A actually "wrap" with regard to the hash table data structure 1720 such that, for example, dependence information for an access to element A[5] will be written to hash set 0, dependence information for an access to element A[6] will be written to hash set 1, and so forth.

The entry 1732 in the first hash set 1730 comprises an access identifier "w" indicating that the access was a write, the address, or index into the array, A[1] of the element that was written to, and the iteration number, i.e. "1", of the access to that element of the array A. Because each hash set 1730 in the hash table data structure 1720 may store entries for different elements of the array A, it is important to store the address, or index into the array, A[i] in the entry to differentiate it from dependence information for other array elements.

Figure 17C:
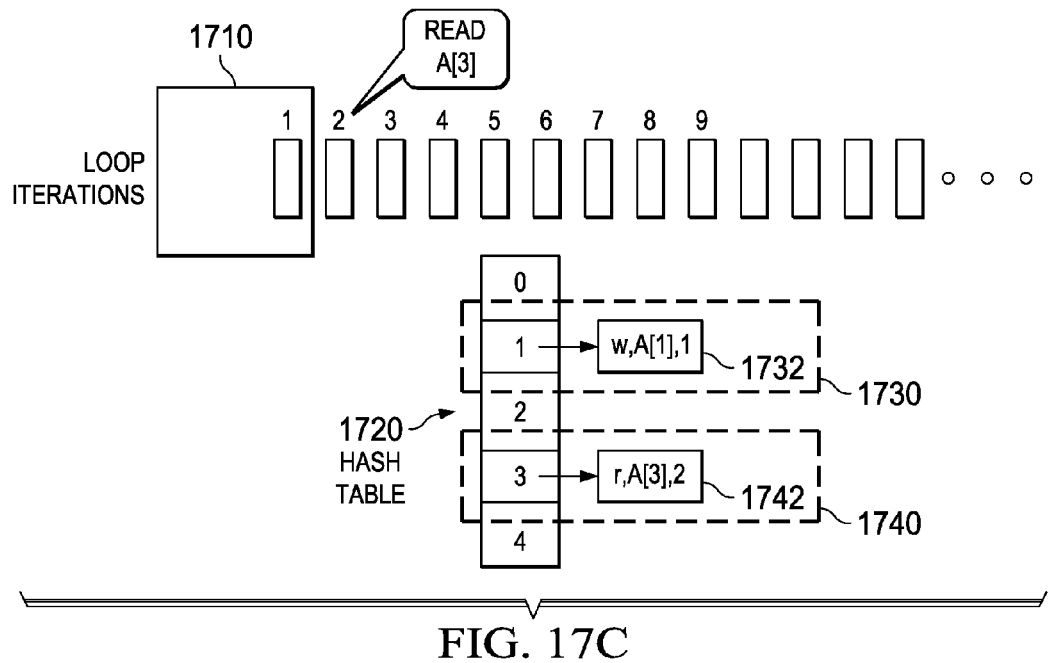

FIG. 17C shows that, in the second iteration, a read of the array element A[3] is performed. Again, a hash function is applied to the address or array index "3" to generate the hash table index pointing to hash set 1740. An entry 1742 is written to the hash set 1740 indicating the read (r) to array element A[3] in iteration "2."

As shown in FIG. 17C, the moving look-back window 1710 is moved to encompass the first iteration. Thus, the moving look-back window 1710 always encompasses the prior iteration back to an iteration corresponding to the current iteration minus the width or size of the window 1710. For example, if the current iteration was iteration 4 and the size of the window is 3 iterations, then the window 1710 would encompass iterations 1, 2, and 3. In this case, for the purpose of eliminating dependence information from the hash sets of the hash table data structure 1720, there is no dependence information in the hash table data structure 1720 for iterations prior to the moving look-back window 1710.

Figure 17D:
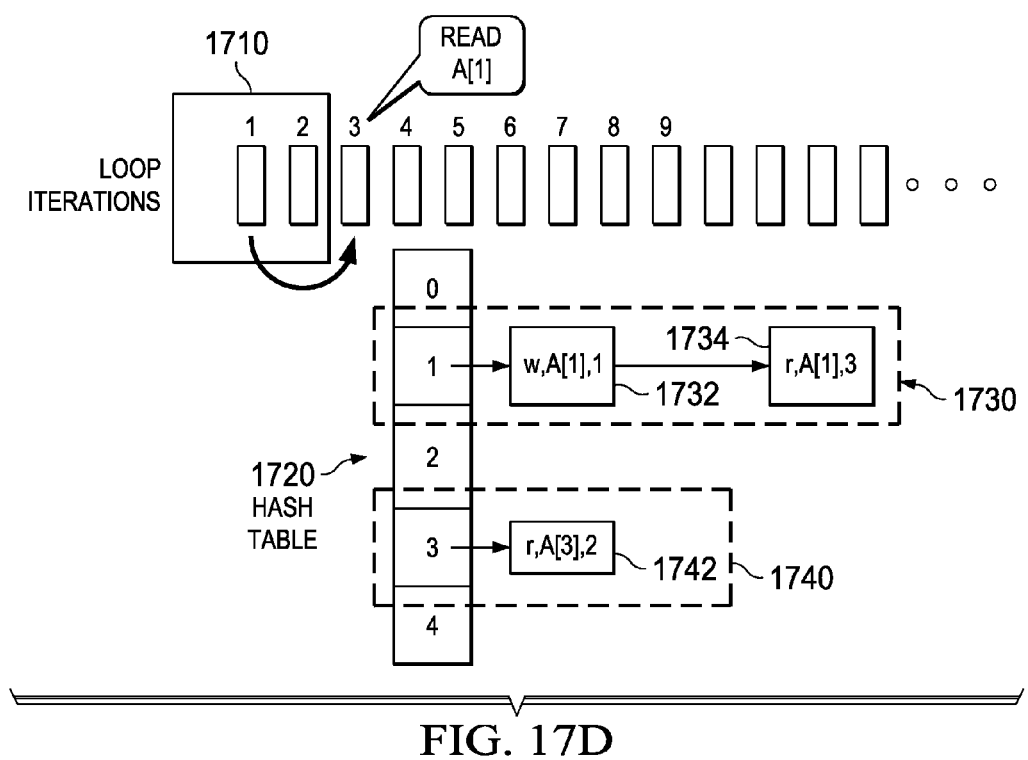

FIG. 17D shows the third iteration of the portion of code in which a read of the element A[1] in array A is performed. According to the application of the hash function, the dependence information for this read is written to an entry 1734 in hash set 1730, which is linked to the previous entry 1732 in hash set 1730. As shown in FIG. 17D, this entry 1734 indicates a read (r) to array element A[1] in iteration "3". Again, similar to that described above with regard to FIG. 17C, the moving look-back window 1710 is shifted to encompass iterations 1 and 2. Again, there is no dependence information in the hash table data structure 1720 for iterations prior to the moving look-back window 1710.

Figure 17E:
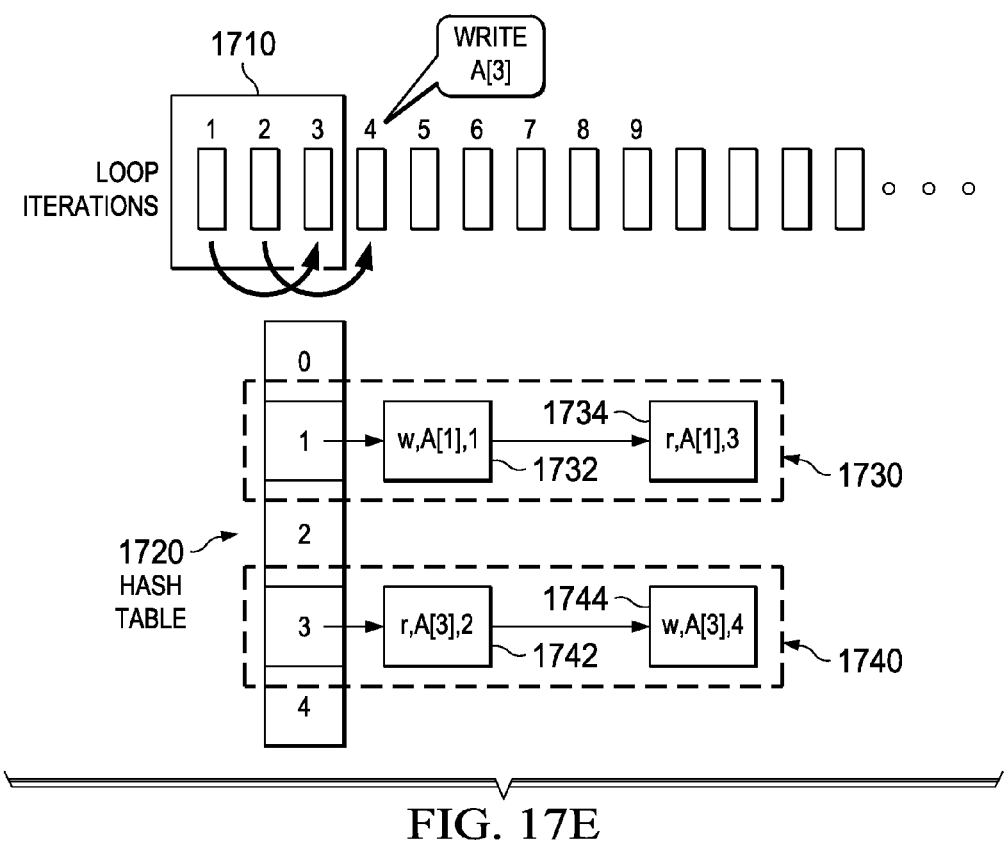

FIG. 17E shows a fourth iteration of the portion of code in which a write of the element A[3] in array A is performed. According to the application of the hash function, the dependence information for this read is written to an entry 1744 in hash set 1740, which is linked to the previous entry 1742 in hash set 1740. As shown in FIG. 17E, this entry 1744 indicates a write (w) to array element A[3] in iteration "4". Again, similar to that described above with regard to FIGS. 17C and 17D, the moving look-back window 1710 is shifted to encompass iterations 1, 2 and 3. Again, there is no dependence information in the hash table data structure 1720 for iterations prior to the moving look-back window 1710.

Figure 17F:
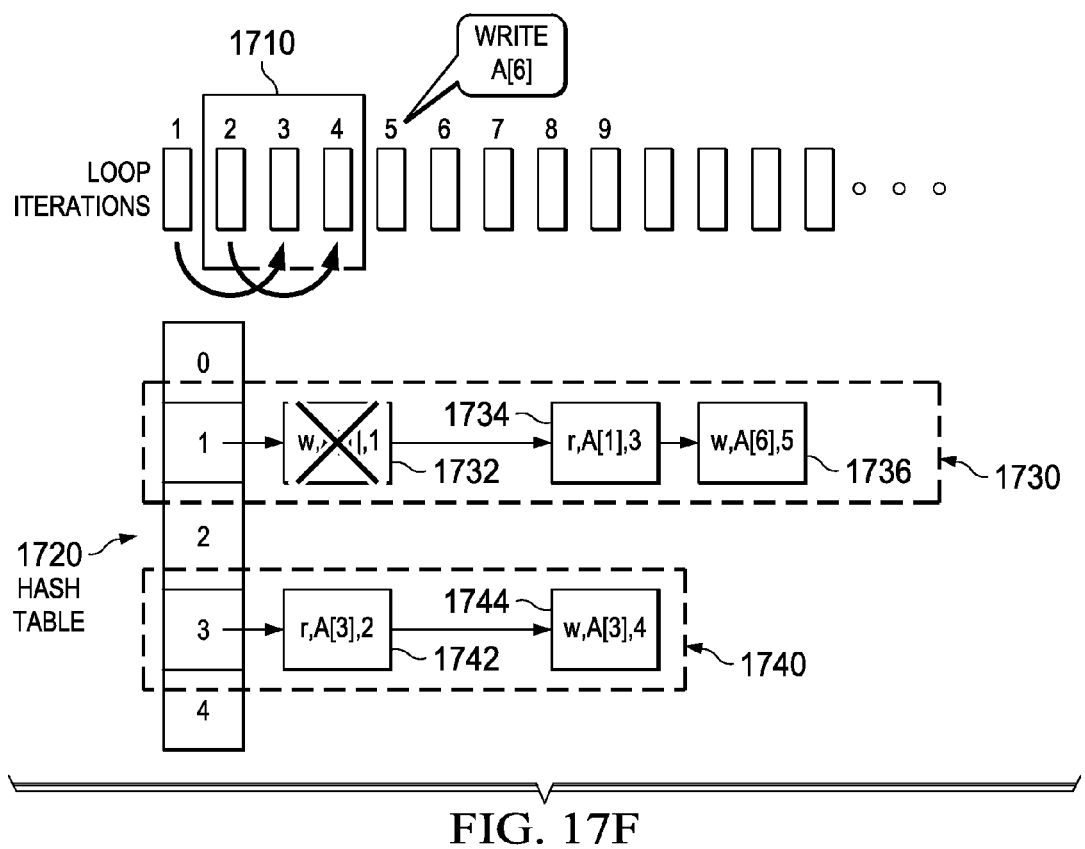

FIG. 17F shows the fifth iteration of the portion of code in which a write of the element A[6] in array A is performed. According to the application of the hash function, the dependence information for this write is written to an entry 1736 in hash set 1730, which is linked to the previous entries 1732 and 1734 in hash set 1730. As discussed above, the hash function is assumed to be modulo function, which serves to essentially wrap from the last hash set of the hash table data structure 1720 to the beginning hash set based on the address or array index A[i]. As shown in FIG. 17F, this entry 1736 indicates a write (w) to array element A[6] in iteration "5".

Again, similar to what was described above with regard to FIG. 17C, the moving look-back window 1710 is shifted to encompass iterations 2, 3, and 4. However, in this case, the hash set 1730 does contain an entry 1732 that corresponds to an iteration, i.e. iteration "1," prior to the moving look-back window 1710. Thus, this entry 1732 is eliminated by the policy of the moving look-back window mechanisms of these further embodiments, which may be implemented by either hardware, software, of a combination of hardware and software logic. To eliminate the entry 1732, the pointer from the hash table data structure 1720 index to the first entry in the linked list may be updated to simply point to the entry 1734, thereby freeing the bits of entry 1732 for reuse. It should be appreciated that this is a lazy removal mechanism where entries are not removed or eliminated until an entry is added to delete the obsolete entry. Thus, for example, if in a first iteration, an access entry is also recorded in hash set 1740, this access entry would be eliminated only when there is a new entry added to hash set 1740 in a similar manner as described above with regard to hash set 1730.

Figure 17G:
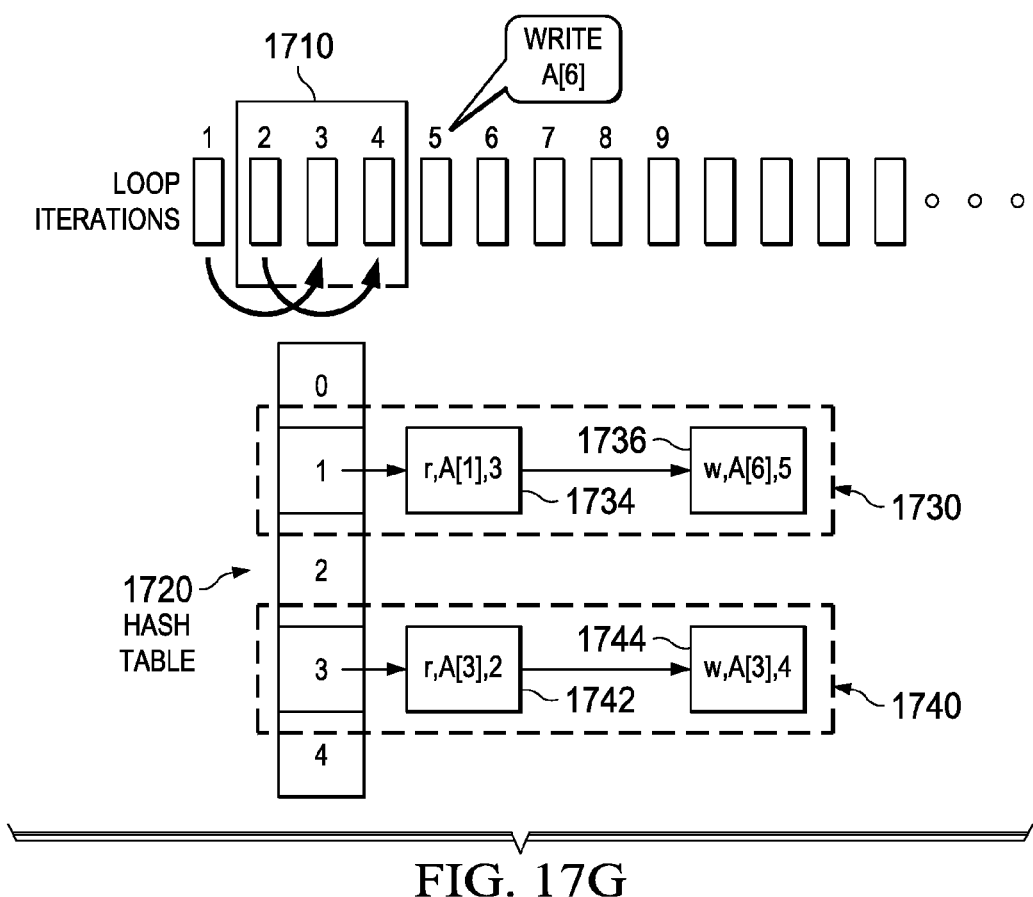

FIG. 17G illustrates the result of the removal of the entry 1732 with the hash set 1730 being comprised of only the entries 1734 and 1736. Thus, if dependence information is investigated at this point in time, the dependence information of entry 1732 would no longer be available since it was not within the moving look-back window 1710 and thus, is not of importance to the particular processes utilizing the dependence information which are only concerned with the iterations that are close to one another within a predetermined dependence distance.

To identify dependences using the hash table discussed above, for each access of the current iteration, the address or index is used to hash into the hash table. The elements in the hash set are checked one by one. Once an element is found that could cause a dependence (read-after-write, write-after-write, write-after-read), the iteration number of that access is used to compute the dependence distance.

The hash table based mechanism described above with regard to FIGS. 16 and 17A-17G provides a guaranteed determination of dependence/independence within the given window size, i.e. a maximum dependence distance. However, the processing time for this mechanism is non-constant and the memory space required is non-constant since there may be multiple accesses to one or more arrays in a single iteration. The linked list of the hash table embodiment slows down hash table operation. Such slowdown becomes more apparent as the linked list grows.

In an alternative embodiment, a circular buffer is utilized that has a fixed size to store entries hashed to the same index. A pointer points to the head of the circular buffer. A last iteration value (last_iter) is stored in a register corresponding to the circular buffer and is used to identify the iteration number of the entry that was last kicked out of the circular buffer. In contrast to the hash table, each set in a circular buffer is of fixed size. The window size in this embodiment is dynamically and automatically adjusted, as discussed hereafter. Thus, the circular buffer embodiment provides a guaranteed low upper bound on execution time since the number of entries within the circular buffer is fixed, and a guaranteed low upper bound on the memory amount required. Moreover, with the hash table based embodiment, the dependence distance of the moving look-back window is fixed in size while in the circular buffer, as described hereafter, the dependence distance is adjusted dynamically based on whether there are more or less conflicts in the circular buffer.

Figures 18, 19:
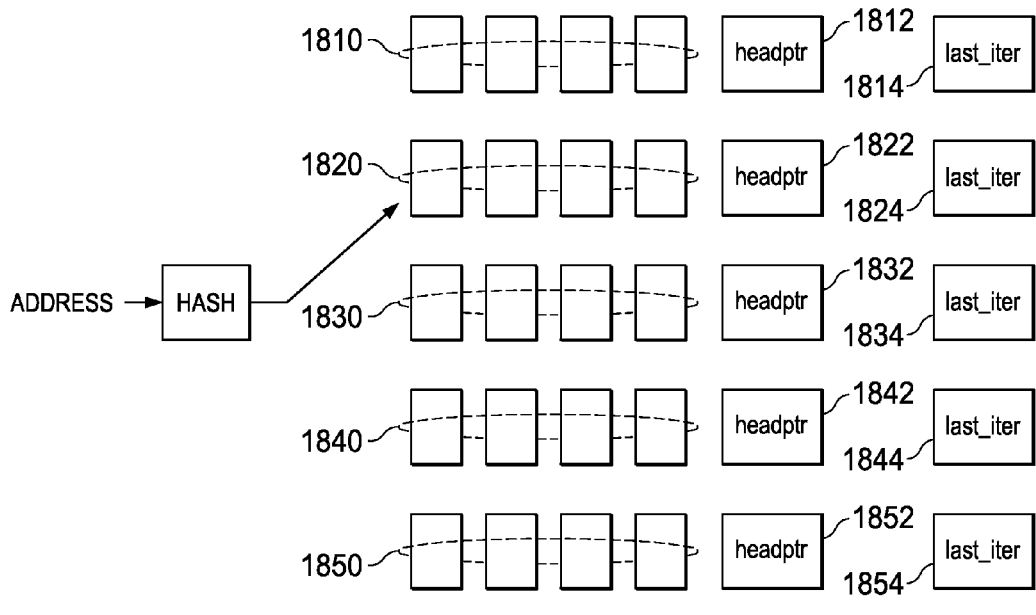
FIG. 18 illustrates a circular buffer based implementation of a self-purging dependence data structure in accordance with one illustrative embodiment.
FIG. 19 is an example diagram illustrating an example operation of the circular buffer based implementation in accordance with one illustrative embodiment.

FIG. 18 illustrates a circular buffer based implementation of a self-purging dependence data structure in accordance with one illustrative embodiment. With the circular buffer based implementation, a hash set of circular buffers 1810-1850 are provided per thread. A circular buffer is a buffer for which entries are added sequentially and the buffer automatically rewinds and overwrites old entries. For each circular buffer 1810-1850, a head pointer 1812, 1822, 1832, 1842, 1852 points to the newest entry in the corresponding circular buffer 1810-1850.

As shown in FIG. 18, each address, e.g., array index A[i], is hashed by a hash function 1860 to get an index. Each index of the hash function 1860 corresponds to a circular buffer 1810-1850 which stores all addresses mapped to it. More than one index may point to the same circular buffer 1810-1850. Each circular buffer 1810-1850 preferably has a fixed size, and thus a maximum number of entries.

Like in the hash table embodiment previously described, each entry 1870 in the circular buffers 1810-1850 contains three fields: an address tag, an iteration number, and an access type. Again, since each circular buffer 1810-1850 may store dependence information for a plurality of array elements, the address tag is used to distinguish among the different addresses mapped to the same circular buffer 1810-1850. The iteration number indicates the iteration where this access occurred. The access type distinguishes between read and write accesses.

Since a circular buffer discards old entries to accommodate new entries, it corresponds to a moving look-back window that keeps track of only a fixed number of entries. Once an old entry is removed from the circular buffer, the information associated with that entry is lost. To minimally keep track of the discarded entries, each circular buffer 1810-1850 is associated with a single additional value, called the last iteration value—last_iter 1814, 1824, 1834, 1844, 1854, which may be stored in a register associated with the circular buffer 1810-1850 in a similar manner that the head pointer 1812, 1822, 1832, 1842, 1852 is stored in a register associated with the circular buffer 1810-1850. The last_iter value records the iteration number of the most recently discarded entry. When a search in the circular buffer 1810-1850 does not yield a hit, the dependence is automatically assumed to be from last_iter. This satisfies the safety rules previously noted above, i.e. it is safe to assume a dependence when there is not one indicated.

FIG. 19 is an example diagram illustrating an operation of the circular buffer based implementation in accordance with one illustrative embodiment. With regard to FIG. 19, consider variable A, B, and C, all hashed to the same dual-entry circular buffer. During iteration 0, read accesses to variables A and B are recorded in the circular buffer. The last_iter value is −1, indicating that no entry has been discarded from the circular buffer yet. During iteration 1, a "read C" entry is added to the buffer by removing the oldest "read A at iteration 0" entry from the circular buffer. The value of last_iter becomes 0 since iteration 0 is the iteration number associated with the removed "read A at iteration 0" entry. During iteration 2, the write access to variable B initiates a search in the circular buffer, resulting in a hit with the "read B at iteration 0" entry. This hit indicates a dependence from iterations 0 to 2. Another entry is discarded when adding the "write B at iteration 2" entry in the circular buffer and the last_iter value is updated to "0" since the entry that was discarded, i.e. the read of variable B at iteration 0, was performed at iteration 0. During iteration 3, write access to variable A triggers a search of A in the circular buffer. This search misses since there are currently no entries in the circular buffer for variable A. Therefore, it is conservatively assumed that a dependence from last_iter=0 to the current iteration exists. This operation may continue on with each subsequent iteration.

Thus, with the circular buffer embodiment, a constant memory requirement and lower access latency is achieved than that of the hash table embodiment described above, although the hash table embodiment is a beneficial embodiment to utilize as well. With the circular buffer embodiment, the number of past entries is fixed, but the moving look-back window size, i.e. how many iterations should be looked back at, is not. This guarantees a low upper bound on execution time. In addition, it is possible to have two hash sets of circular buffers per thread, one for read and one for write accesses, instead of the hash set described above.

Figure 20:
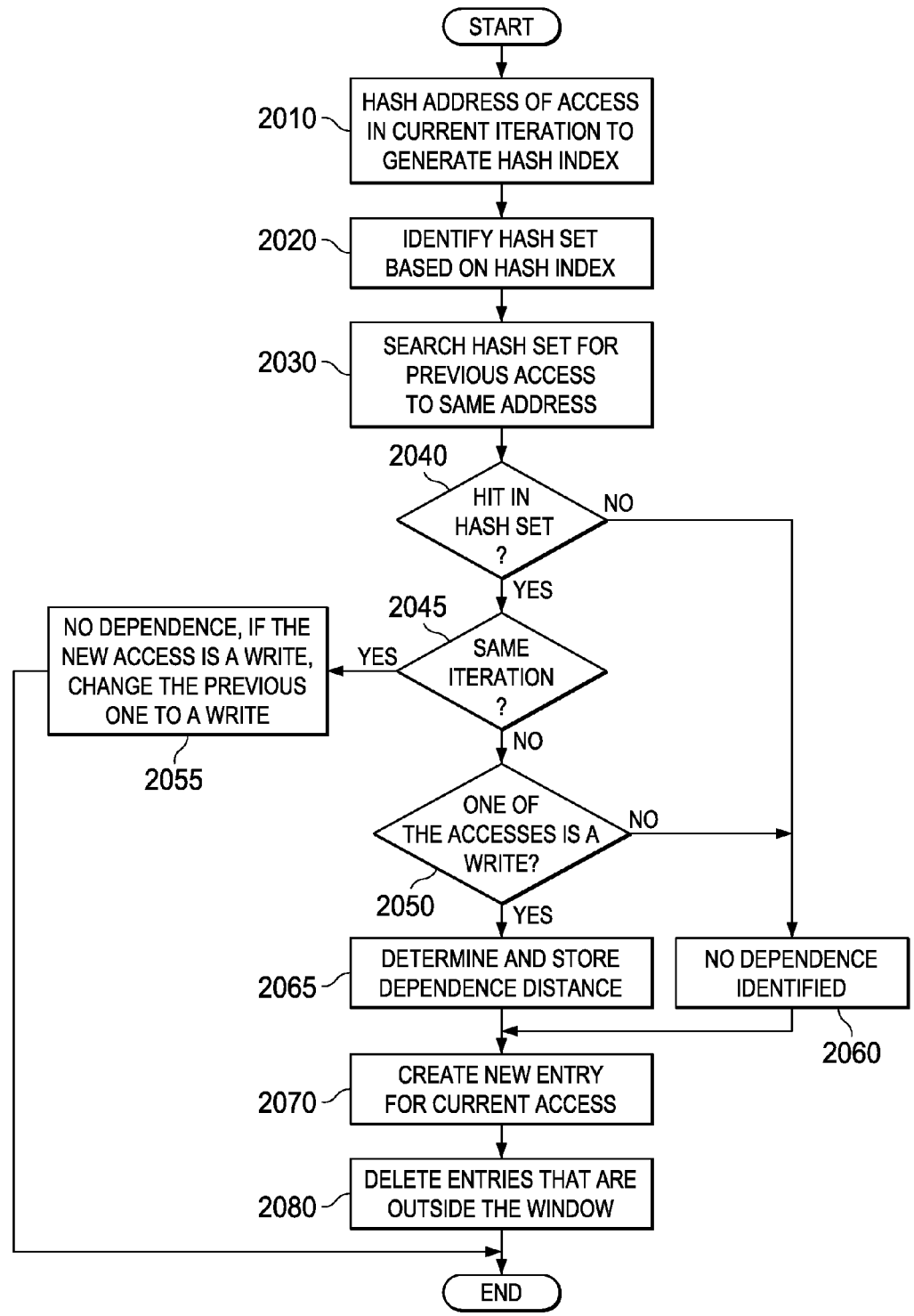
FIG. 20 is a flowchart outlining an operation for utilizing a hash table data structure and moving look-back window to track dependences in accordance with one illustrative embodiment.

FIG. 20 is a flowchart outlining an operation for utilizing a hash table data structure and moving look-back window to track dependences in accordance with one illustrative embodiment. As shown in FIG. 20, the operation starts with a hash of an address of an access in the current iteration of the portion of code to generate a hash index (step 2010). The hash index is used to identify a hash set corresponding to the hash index (step 2020). The hash set is searched for a previous read, write, or read and write to the same address (step 2030).

A determination is made as to whether there is a hit in the identified hash set (step 2040). If there is a hit in the hash set, a determination is made as to whether the hit is for a same iteration as a previous access entry (step 2045). If it is for a same iteration as a previous access in the hash set, then a determination is made that there is no dependence and if the new access is a write, the previous access entry in the hash set for the same iteration is changed to a write (step 2055). It should be noted that when, in this flowchart and the one following in FIG. 21, a determination is made that there is no dependence, this means that there is no dependence to entries in the hash table. Thus, there is an implicit dependence assumed to a last iteration before the moving look-back window.

If the new access is not for a same iteration, a determination is made as to whether one of the accesses in the hash set is a write (step 2050). If one of the accesses is not a write, then the operation proceeds to step 2060 described hereafter. If one of the accesses is a write, then the dependence distance is determined and stored (step 2065) and the operation continues to step 2070 described hereafter.

If there is not a hit in the hash set (step 2040), or if one of the accesses is not a write (step 2050), a determination is made that there is no dependence identified (step 2060). Thereafter, or after determining and storing the dependence distance (step 2065), a new entry is created for the current (new) access (step 2070). Thereafter, entries that are outside the moving look-back window are deleted (step 2080). The operation then terminates. It should be appreciated that while the flowchart indicates a termination, the operation may be repeated with each subsequent access in the same or subsequent iterations.

Figure 21:
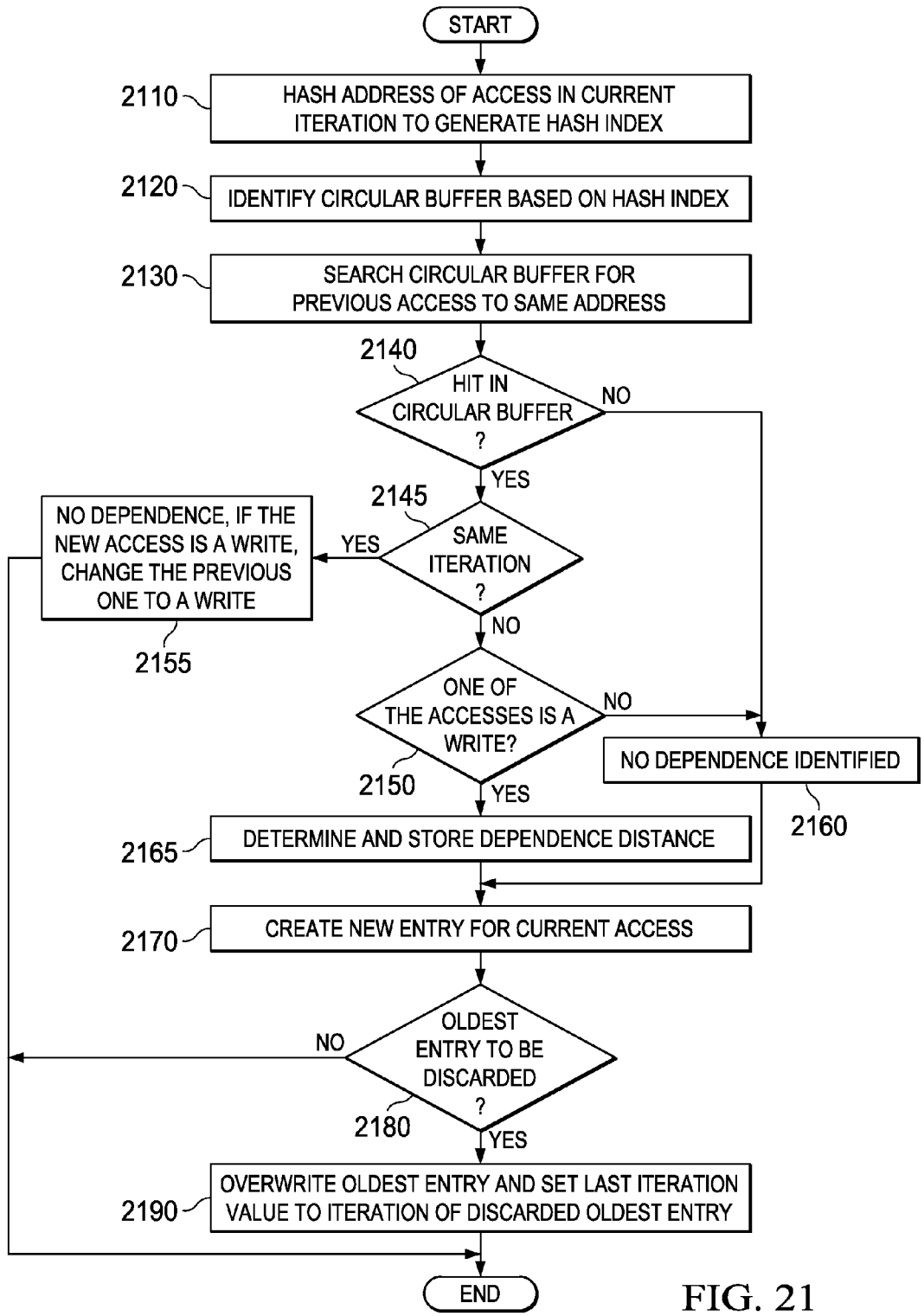
FIG. 21 is a flowchart outlining an operation for utilizing a circular buffer to track dependences in accordance with one illustrative embodiment.

FIG. 21 is a flowchart outlining an operation for utilizing a circular buffer to track dependences in accordance with one illustrative embodiment. As shown in FIG. 21, the operation starts with a hash of an address of an access in the current iteration of the portion of code to generate a hash index (step 2110). The hash index is used to identify a circular buffer corresponding to the hash index (step 2120). The circular buffer is searched for a previous read, write, or read and write to the same address (step 2130).

A determination is made as to whether there is a hit in the identified circular buffer (step 2140). If there is a hit in the hash set, a determination is made as to whether the hit is for a same iteration as a previous access entry (step 2145). If it is for a same iteration as a previous access in the hash set, then a determination is made that there is no dependence and if the new access is a write, the previous access entry in the hash set for the same iteration is changed to a write (step 2155).

If the new access is not for a same iteration, a determination is made as to whether one of the accesses in the hash set is a write (step 2150). If one of the accesses is not a write, then the operation proceeds to step 2160 described hereafter. If one of the accesses is a write, then the dependence distance is determined and stored (step 2165) and the operation continues to step 2070 described hereafter.

If there is not a hit in the hash set (step 2140), or if one of the accesses is not a write (step 2150), a determination is made that there is no dependence identified (step 2160). Thereafter, or after determining and storing the dependence distance (step 2165), a new entry is created for the current (new) access (step 2170).

Thereafter, a determination is made as to whether an oldest entry in the circular buffer needs to be discarded (step 2180). If so, the oldest entry is overwritten with the new entry and the last iteration value is updated to have a value corresponding to the iteration identified in the discarded oldest entry (step 2190). The operation then terminates. It should be appreciated that while the flowchart indicates a termination, the operation may be repeated with each subsequent access in the same or subsequent iterations.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for tracking dependence information for memory accesses over iterations of execution of a portion of code, the method comprising:

receiving, by a processor of the data processing system, from a second processor of the data processing system, a memory access of a current iteration of the portion of code, the memory access having an address for accessing the memory and an access type indicating at least one of a read or a write access type;

generating, by the processor, an entry, in a moving look-back window data structure, corresponding to a memory location accessed by the memory access, wherein the entry comprises at least an identification of the address, the access type, and an iteration number corresponding to the current iteration of the memory access;

utilizing, by the processor, the moving look-back window data structure to determine dependence information for memory accesses over a plurality of iterations of the portion of code; and performing an operation within the data processing system based on the dependence information for memory accesses determined using the moving look-back window data structure, wherein the moving look-back window data structure comprises memory access entries for a moving look-back window defining a predetermined number of prior iterations of execution of the portion of code relative to the current iteration, the predetermined number of prior iterations constituting a width of the moving look-back window, and wherein the predetermined number of prior iterations of execution of the portion of code is less than a total number of prior iterations of execution of the portion of code executed by the second processor.

2. The method of claim 1, wherein the moving look-back window data structure is implemented using a self-purging dependence data structure storage device.

3. The method of claim 2, wherein the self-purging dependence data structure automatically eliminates memory access entries not falling within the width of the moving look-back window relative to the current iteration.

4. The method of claim 3, wherein the self-purging dependence data structure eliminates memory access entries in response to a new entry being added to the self-purging dependence data structure.

5. The method of claim 2, wherein the self-purging dependence data structure comprises a hash table data structure having one or more hash sets, wherein each hash set stores a linked list of zero or more entries, each entry having an iteration number for a memory access corresponding to the entry, an access mode, and an address of the access.

6. The method of claim 5, wherein the number of hash sets in the hash table data structure is less than a number of memory access entries in the moving look-back window such that accesses to two or more different entries result in the same hash index being identified.

7. The method of claim 2, wherein the self-purging dependence data structure comprises at least one circular buffer.

8. The method of claim 7, wherein the self-purging dependence data structure comprises a plurality of circular buffers, and wherein for each access to an array performed by the portion of the code, a hash of the address associated with the access is performed to generate an index identifying a corresponding circular buffer in the plurality of circular buffers.

9. The method of claim 2, wherein there is a self-purging dependence data structure for each array accessed by the portion of code.

10. The method of claim 1, wherein the operation performed within the data processing system comprises modifying a scheduling of memory accesses by an execution of the portion of code based on the determined dependence information for memory accesses.

11. The method of claim 1, wherein, the operation performed within the data processing system comprises at least one of profiling, just-in-time compilation, verification of dependence properties, or an optimization operation.

12. A computer program product comprising a non-transitory computer readable storage medium having a computer readable program stored therein, wherein the computer readable program, when executed on a computing device, causes the computing device to:
receive, from a processor, a memory access of a current iteration of the portion of code, the memory access having an address for accessing the memory and an access type indicating at least one of a read or a write access type;
generate an entry, in a moving look-back window data structure, corresponding to a memory location accessed by the memory access, wherein the entry comprises at least an identification of the address, the access type, and an iteration number corresponding to the current iteration of the memory access;
utilize the moving look-back window data structure to determine dependence information for memory accesses over a plurality of iterations of the portion of code; and
perform an operation within the computing device based on the dependence information for memory accesses determined using the moving look-back window data structure, wherein the moving look-back window data structure comprises memory access entries for a moving look-back window defining a predetermined number of prior iterations of execution of the portion of code relative to the current iteration, the predetermined number of prior iterations constituting a width of the moving look-back window, and wherein the predetermined number of prior iterations of execution of the portion of code is less than a total number of prior iterations of execution of the portion of code executed by the processor.

13. The computer program product of claim 12, wherein the moving look-back window data structure is implemented using a self-purging dependence data structure storage device.

14. The computer program product of claim 13, wherein the self-purging dependence data structure automatically eliminates memory access entries for iterations not falling within the width of the moving look-back window relative to the current iteration.

15. The computer program product of claim 14, wherein the self-purging dependence data structure eliminates memory access entries in response to a new entry being added to the self-purging dependence data structure.

16. The computer program product of claim 13, wherein the self-purging dependence data structure comprises a hash table data structure having one or more hash sets, wherein each hash set stores a linked list of zero or more entries, each entry having an iteration number for a memory access corresponding to the entry, an access mode, and an address of the access.

17. The computer program product of claim 16, wherein the number of hash sets in the hash table data structure is less than a number of memory access entries in the moving look-back window such that accesses to two or more different entries result in a same hash index being identified.

18. The computer program product of claim 13, wherein the self-purging dependence data structure comprises at least one circular buffer.

19. The computer program product of claim 18, wherein the self-purging dependence data structure comprises a plurality of circular buffers, and wherein for each access to an array performed by the portion of the code, a hash of the address associated with the access is performed to generate an index identifying a corresponding circular buffer in the plurality of circular buffers.

20. The computer program product of claim 13, wherein there is a separate self-purging dependence data structure for each array accessed by the portion of code.

21. The computer program product of claim 12, wherein the operation performed within the data processing system comprises modifying a scheduling of memory accessed by an execution of the portion of code based on the determined dependence information for memory accesses.

22. The computer program product of claim 12, wherein the operation performed within the data processing system comprises at least one of profiling, just-in-time compilation, verification of dependence properties, or an optimization operation.

23. An apparatus, comprising:
a processor; and
a memory coupled to the processor, wherein the memory comprises instructions which, when executed by the processor, cause the processor to:
receive, from a second processor, a memory access of a current iteration of the portion of code, the memory access having an address for accessing the memory and an access type indicating at least one of a read or a write access type;
generate an entry, in a moving look-back window data structure, corresponding to a memory location accessed by the memory access, wherein the entry comprises at least an identification of the address, the access type, and an iteration number corresponding to the current iteration of the memory access;
utilize the moving look-back window data structure to determine dependence information for memory accesses over a plurality of iterations of the portion of code; and
perform an operation based on the dependence information for memory accesses determined using the moving look-back window data structure, wherein the moving look-back window data structure comprises memory access entries for a moving look-back window defining a predetermined number of prior iterations of execution of the portion of code relative to the current iteration, the predetermined number of prior iterations constituting a width of the moving look-back window, and wherein the predetermined number of prior iterations of execution of the portion of code is less than a total number of prior iterations of execution of the portion of code executed the second processor.

24. The method of claim 1, wherein the width is a fixed predetermined number of prior iterations relative to the current iteration, representing a maximum dependence distance from the current iteration for which dependence information is maintained for memory accesses of the current iteration.

25. The method of claim 1, wherein the moving look-back window data structure is dynamically updated with each subsequently executed iteration of the portion of code executed by the second processor such that the moving look-back window data structure maintains only entries that fall within a maximum dependence distance defined by the width of the moving look-back window.

\* \* \* \* \*